US010198823B1

(12) United States Patent
Agrawal et al.

(10) Patent No.: US 10,198,823 B1
(45) Date of Patent: Feb. 5, 2019

(54) SEGMENTATION OF OBJECT IMAGE DATA FROM BACKGROUND IMAGE DATA

(71) Applicant: Amazon Technologies, Inc., Seattle, WA (US)

(72) Inventors: Amit Kumar Agrawal, Santa Clara, CA (US); Abhishek Singh, Mountain View, CA (US); Visesh Uday Kumar Chari, San Francisco, CA (US); Lelin Zhang, San Jose, CA (US); Qiang Liu, Cupertino, CA (US); Rohith Mysore Vijaya Kumar, Sunnyvale, CA (US); David Ting-Yu Wu, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/110,767

(22) Filed: Aug. 23, 2018

Related U.S. Application Data

(63) Continuation of application No. 15/472,041, filed on Mar. 28, 2017, now Pat. No. 10,096,122.

(51) Int. Cl.
G06T 7/194 (2017.01)
G06T 11/60 (2006.01)
G06T 7/90 (2017.01)

(52) U.S. Cl.
CPC ........... G06T 7/194 (2017.01); G06T 7/90 (2017.01); G06T 11/60 (2013.01); G06T 2210/22 (2013.01)

(58) Field of Classification Search
CPC . G06T 7/194; G06T 7/90; G06T 11/60; G06T 2210/22
USPC ................. 382/164, 173, 224, 225
See application file for complete search history.

(56) References Cited

U.S. PATENT DOCUMENTS

| 9,679,387 | B2 | 6/2017 | Tian et al. |
| 2003/0235341 | A1 | 12/2003 | Gokturk et al. |
| 2013/0259374 | A1 | 10/2013 | He et al. |
| 2015/0063681 | A1 | 3/2015 | Bhardwaj et al. |
| 2015/0206312 | A1 | 7/2015 | Luo et al. |
| 2017/0086712 | A1 | 3/2017 | Mauro et al. |
| 2017/0124717 | A1 | 5/2017 | Baruch et al. |
| 2017/0295355 | A1 | 10/2017 | Tanaka |

OTHER PUBLICATIONS

Rhemann et al.; A Perceptually Motivated Online Benchmark for Image Matting; Microsoft Research Cambridge PhD Scholarship Program; Jun. 20, 2009; 8 pgs.

(Continued)

Primary Examiner — Daniel G Mariam
(74) Attorney, Agent, or Firm — K&L Gates LLP

(57) ABSTRACT

Devices and techniques are generally described for segmentation of object image data from background image data. In some examples, the segmentation of object image data may comprise capturing image data comprising color data and depth data. In some examples, the segmentation of object image data may further include separating the depth data into a plurality of clusters of image data, wherein each cluster is associated with a respective range of depth values. In various examples, the segmentation of object image data may comprise selecting a main cluster of image data as corresponding to an object of interest in the image data. In various other examples, the segmentation of object image data may comprise identifying pixels of the main cluster that correspond to the object of interest.

20 Claims, 11 Drawing Sheets

(56) References Cited

OTHER PUBLICATIONS

Cho et al.; An Introduction to Alpha Matting; Vienna Science and Technology Fund; Dec. 1, 2013; 51 pgs.
Shahrian et al.; Survey of Image Matting; Medical University of Viena; Dec. 1, 2013; 68 pgs.
Price; Challenges and Future Work in Matting; Adobe Research; Feb. 1, 2013; 80 pgs.
Shahrian et al.; Video Matting; Medical University of Viena; Dec. 1, 2013; 26 pgs.
Author Unknown; Alpha Matting Evaluation Website; retrieved on Mar. 28, 2017 from http://www.alphamatting.com; 1 page.

SEGMENTATION OF OBJECT IMAGE DATA FROM BACKGROUND IMAGE DATA

CROSS-REFERENCE TO RELATED APPLICATIONS

This application is a continuation of U.S. patent application Ser. No. 15/472,041, filed Mar. 28, 2017, now U.S. Pat. No. 10,096,122, the contents of which are incorporated herein by reference in their entity.

BACKGROUND

Cameras and other image sensors may be used to capture images and/or videos of a physical environment. Often, individuals take digital photographs of themselves and/or of others to memorialize a moment or to share photographs on social networks and/or over the internet. Images may be edited and altered to create desired effects. Image data may be stored and organized to aid in accessibility of particular image.

DETAILED DESCRIPTION

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples described herein are directed to systems and methods for processing image content. Image data, as described herein, may refer to stand-alone frames of image data or to multiple frames of sequential image data, appended together to form a video. Image data may be comprised of a plurality of pixels arranged in a two-dimensional grid including an x component representing a horizontal direction in the grid and a y component representing a vertical direction or axis in the grid. A pixel may be the smallest addressable unit of image data in an image. A particular pixel may be identified by an x value, representing the horizontal position of the pixel in the two-dimensional grid and a y value, representing the vertical position of the pixel in the two-dimensional grid. Additionally, as described herein, pixels of image data may include depth data representing a distance between a surface represented by the pixel of image data and the image sensor (e.g., a depth sensor).

Figure 1A:
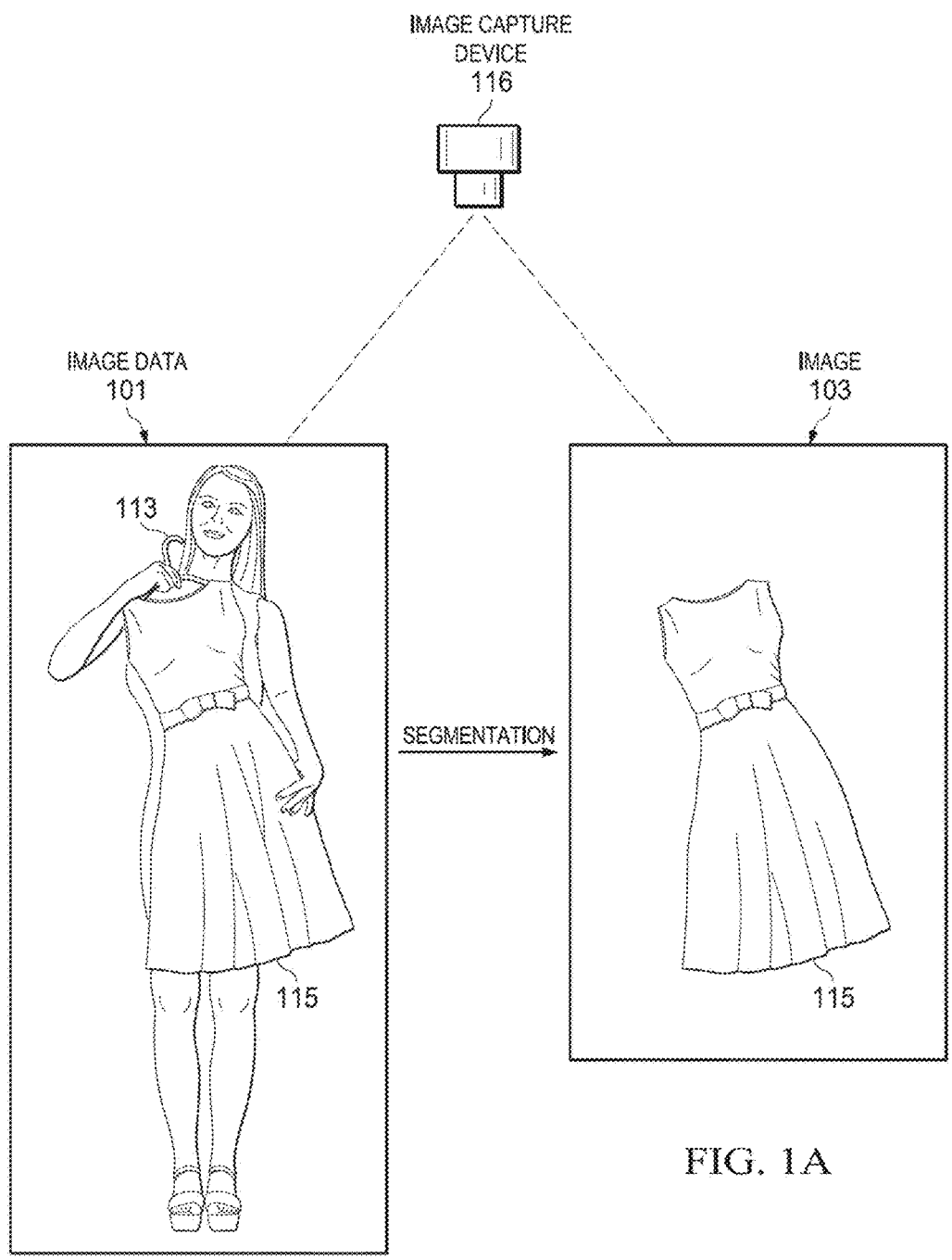
FIG. 1A is a diagram depicting segmentation of object image data from background image data, in accordance with various aspects of the present disclosure.

FIG. 1A is a diagram depicting segmentation of object image data from background image data, in accordance with various aspects of the present disclosure. In this implementation, it is desired to capture an image of a person holding an article of clothing 115 and then segment the image data to produce a cropped image 103 of the article of clothing 115 with the other objects around the clothing 115 (e.g., the person holding the clothing, the clothing hanger, and/or any features in the background of the image) removed. As is described in further detail below, an image capture system 10 may include an image capture device 116 comprising a digital camera module effective to capture color images and a depth sensor effective to generate depth images. In the example depicted in FIG. 1A, image capture device 116 may capture image data 101. Image data 101 may comprise both an RGB image captured by the digital camera module and an infrared image captured by the depth sensor. The depth sensor may then generate a depth map from the infrared image, as described in further detail below. In the illustrated example, the image capture device 116 captures a scene including a person holding an article of clothing 115, and the image data 101 comprises pixel data representing the person holding the article of clothing 115 positioned between the human and the image capture device 116. In some examples, the article of clothing may be on a hanger 113.

As described in further detail below, image capture device 116 may be effective to detect a ground plane in the image data 101 so as to identify the floor on which the person is standing in the image data. In an example, a random sample consensus ("RANSAC") method may be used to detect the ground plane of the image data 101. If it is desired to remove the floor from the captured image, the portion of the image data corresponding to the ground plane may be removed. Image capture device 116 may segment the remaining image data 101 into a plurality of clusters (sometimes referred to herein as "blobs" and/or "objects") based on depth data from the depth sensor. In various examples, a three dimensional point cloud generated from image data 101 may be used to segment the image data 101 into clusters. Pixels with similar depth values (e.g., within a defined tolerance) may be segmented into the same cluster, while pixels with dissimilar depth values may be segmented into different clusters.

As described in further detail below, a main blob may be identified from among the other blobs. In the example depicted in FIG. 1A, the main blob may correspond to the image data representing the standing human and the article of clothing 115. Additionally, the main blob may include data representing a hanger 113 upon which the article of clothing 115 is hung and/or a hand of the person holding the article of clothing 115. A histogram of depth values of the main blob may be generated. The histogram of depth values may be used to segment the image data representing the article of clothing 115 from the image data representing the standing human. This is because the article of clothing, being held in front of the standing human, will have different depth values relative to the standing human in the depth map. Two peaks may appear in the histogram of depth values, with one peak representing the standing human and the other peak representing the article of clothing 115. The image data representing the standing human may be segmented from the image data representing the article of clothing 115 by discarding image data with depth values above a threshold depth value. In various examples, the threshold depth value may be determined by calculating a local minimum depth value among the depth image data.

As described in further detail below, a binary mask of the depth domain image data may be generated. A directional filter may be applied near the top of the cluster of image data representing the article of clothing to remove image data representing the clothing hanger 113.

As described in further detail below, the depth domain image data may be used to classify whether each pixel in the image data represents foreground or background image data, with the foreground pixels corresponding to an object of interest in the image and the background pixels corresponding to other features not of interest, which will be cropped from the final processed image. For example, pixels representing the article of clothing 115 may be labeled as foreground, while pixels with large depth values indicating objects and/or surfaces that are far away from image capture device 116 may be labeled as background. As described herein, "labeling" pixels as foreground or background may include encoding the pixel with foreground indicator data or background indicator data that classifies the pixel as either foreground or background, respectively. In various examples, clusters of pixels may be encoded with foreground indicator data or background indicator data to effectively classify all pixels within the cluster. Foreground indicator data and background indicator data may be one or more bits that may indicate whether the pixel and/or cluster is classified as foreground or background. The depth data may be mapped to color image data captured by a digital camera module of image capture device 116 based on a known distance between the depth sensor and the digital camera module.

As described in further detail below, a skin color filter may be used to remove image data representing human skin from the image data representing the article of clothing 115. For example, image data representing a person's hand holding the article of clothing may be filtered from the image data representing the article of clothing by labeling the image data representing the person's hand as background image data.

As described in further detail below, multi-level matting may be used to refine labels of the image data to segment the image data representing the clothing 115 from background image data. Denoising filters may be used to smooth boundaries of the article of clothing 115 to provide a high quality segmentation with borders that have a natural look to the human eye. In some examples, a segmented image wherein object-of-interest image data has been segmented from background image data may be referred to herein as a "cropped image". In a segmented image, the pixels representing the object of interest may be encoded with foreground indicator data and may sometimes be referred to as "foreground pixels". Similarly, the pixels representing the background may be encoded with background indicator data and may sometimes be referred to as "background pixels". In some examples, background pixels may be deleted to generate an image showing only the object of interest (e.g., only the foreground pixels). In various other examples, a visual indication may be used to distinguish foreground pixels from background pixels. For examples, background pixels may be blurred to generate a depth of field effect. In still other examples, background pixels may be color-filtered or replaced with other image data to change the background to a simulated background.

Figure 1B:
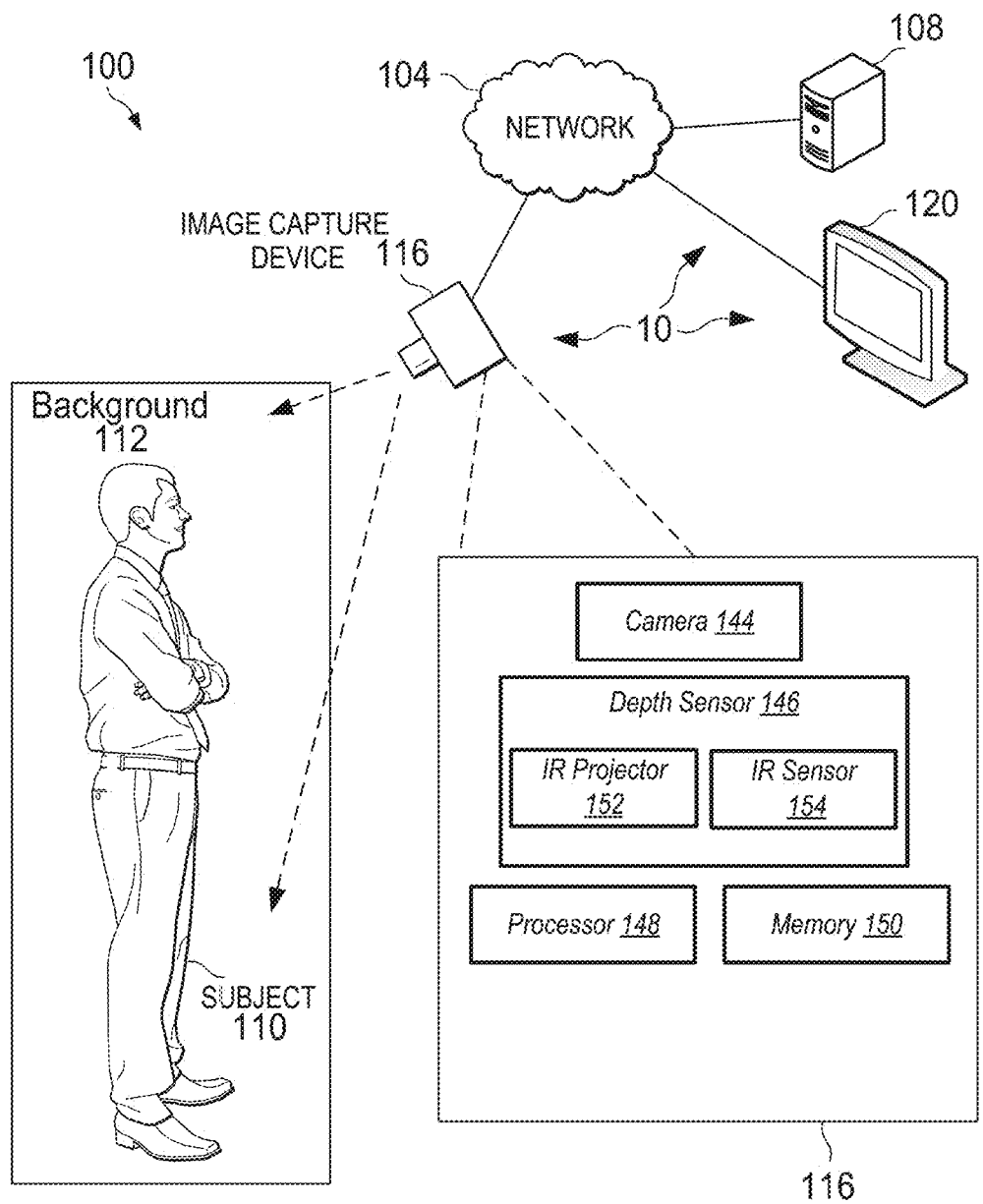
FIG. 1B is a diagram showing an example environment of an image capture system, arranged in accordance with various aspects of the present disclosure.

FIG. 1B is a diagram showing an example environment 100 of an image capture device 116, arranged in accordance with various aspects of the present disclosure. In various examples, the environment 100 may comprise image capture device 116. In various examples, image capture device 116 may be effective to capture an image of a subject 110. In some examples, image data representing an image of the subject 110 may also include image data representing a background 112 which may include image data representing one or more areas around and/or behind the subject captured by image capture device 116. Subject 110 may comprise any visible subject matter capable of being photographed by image capture device 116. In some common examples, subject 110 may comprise one or more people, animals, and/or objects. Background 112 may be, for example, a room, space, or other area in which the subject 110 is located. For example, subject 110 may comprise a human holding an article of clothing. In the example, background 112 may be the room in which the human subject 110 as well as anything captured in the image data other than the subject 110. For example, a bed or desk behind the subject 110 and visible in an image captured of the subject 110 may be considered part of background 112.

Image capture device 116 may include, for example, a digital camera module 144. The digital camera module 144 may comprise any suitable type of image sensor device or devices, such as a charge coupled device (CCD) and/or a complementary metal-oxide semiconductor (CMOS) sensor effective to capture image data from environment 100. In various examples, digital camera module 144 of image capture device 116 may comprise a 5 megapixel color (RGB) camera. Image capture device 116 may include one or more lenses and may be positioned so as to capture images of a portion of environment 100 disposed along an optical axis of image capture device 116. In various examples, lenses of image capture device 116 may be wide-angle lenses effective to capture an angle of view greater than about 55°. Image capture device 116 may include, or may be configured to be in communication with, a processing element (e.g., processor 148) and/or a memory (e.g., memory 150). Although in FIG. 1B image capture device 116 is shown as being angled downward toward a subject 110, image capture device 116 may be positioned at any angle within environment 100.

Image capture device 116 may further comprise a depth sensor 146. Depth sensor 146 may comprise, for example, an infrared projector 152 and an infrared sensor 154. Depth sensor 146 may be configured in communication with processor 148 and memory 150 of image capture device 116.

Processor 148 may execute instructions stored in memory 150 to control infrared projector 152 to emit one or more patterns of structured infrared light. Infrared sensor 154 may detect the structured light reflected from surfaces of environment 100 (e.g., from surfaces of background 112). Processor 148 may construct a depth map of the infrared light detected by infrared sensor 154 based on deformations in the patterns of structured IR light reflected from irregular surfaces of environment 100. Depth data may be determined for each pixel in the depth map image data. In various examples, depth data may relate to a distance between the portion of environment 100 represented by a particular pixel and the IR sensor 154. More generally, depth data for a particular pixel may relate to a distance between the portion of environment 100 represented in the image data by the particular pixel and the image capture device 116.

In various examples, a depth map generated by depth sensor 146 may model the surface shape, reflectance, color, and/or microgeometry of the environment 100 (including subject 110 and background 112). Although in the examples above a structured light depth sensor is described, in other examples, a time-of-flight depth sensor may be used to generate the depth map used for segmentation of image data, in accordance with various embodiments of the present disclosure.

As described in further detail below, depth data may be used to automatically segment image data representing various items in environment 100 from image data representing other items in environment 100. For example, depth data may be used to segment image data representing a human from image data representing portions of a room in which the human is standing. In some other examples, depth data may be used to segment image data representing an object held in front of a human from the image data representing the human. In various cases, the depth data may allow for a coarse segmentation of image data from other, background image data. As described in further detail below, color image data captured by digital camera module 144 may be used to refine and improve the coarse segmentation of image data performed using the depth data from depth sensor 146.

Each pixel of image data captured by image capture device 116 may comprise color information generated by digital camera module 144 and depth information generated by depth sensor 146. In some examples, digital camera module 144 and depth sensor 146 may be physically located in a known, spaced relationship within a casing and/or frame of image capture device 116. Due to the known placement of digital camera module 144 vis-à-vis depth sensor 146, color image data (e.g., RGB data) captured by digital camera module 144 may be aligned with (e.g., "mapped to") depth data captured by depth sensor 146. In turn, both color information and depth information may be known for pixels of image data captured by image capture device 116. The pixels of image data may, in turn, correspond to particular positions within environment 100.

In various examples, image capture device 116 may be configured in communication with one or more computing devices 108 via a network 104. Network 104 may be, for example, the internet, an intranet, a wide area network, a local area network, or the like. In some examples, image capture device 116 may send image data to one or more other computing devices and/or display devices (e.g., display 120) over network 104. For example, image capture device 116 may send image data representing subject 110 and/or background 112 to a remote computing device 108 for image processing, storage, and/or display.

A user of image capture device 116 may use a companion software application executing on the user's computing device (e.g., a smartphone) to control image capture device 116 to capture images, video, and/or audio (e.g., in instances in which image capture device 116 includes a microphone) from environment 100. For example, subject 110 may be a human user of image capture device 116. Subject 110 may control image capture device 116 to capture an image of subject 110 and the portion of the environment 100 that is within the field of view of the lens of image capture device 116 (e.g., background 112). In some examples, subject 110 may control image capture device 116 to process captured image data and/or send image data to another device or display.

As is described in further detail below, the user of image capture device 116 may control the image capture device 116 in a variety of ways. For example, the user (e.g., subject 110) may control image capture device 116 using voice commands, a companion software application installed on and executed by a mobile device, a desktop computing device, or other terminal, or by a dedicated hardware controller configured to be in communication with image capture device 116. In various examples, the controller device (not shown in FIG. 1B) may communicate with image capture device 116 using network 104 which may be, for example, a Wi-Fi network. In some other examples, the controller device may communicate with image capture device 116 using an infrared signal or other short-range wireless signal (e.g., a Bluetooth signal), wired communication, and/or by a user interface of image capture device 116. In examples where image capture device 116 is effective to communicate wirelessly, image capture device 116 may include a wireless transmitter and/or receivers (not shown in FIG. 1B).

Figure 2:
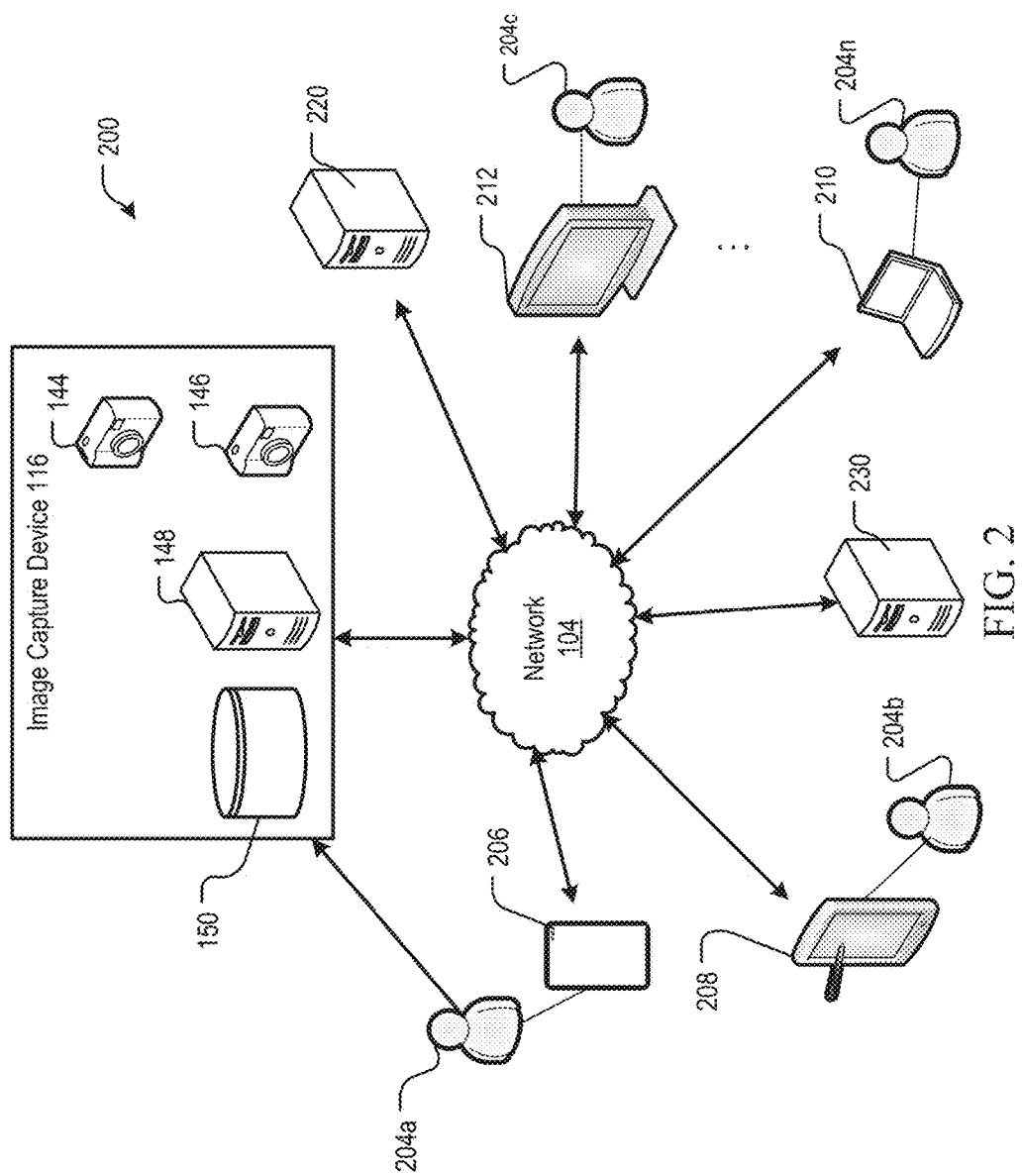
FIG. 2 is a diagram showing an example environment with which the image capture system depicted in FIG. 1B may be used, in accordance with various aspects of the present disclosure.

FIG. 2 is a diagram showing one example of an environment 200 with which the image capture system depicted in FIG. 1B may be used, in accordance with various aspects of the present disclosure. The environment 200 comprises image capture device 116 and users 204a, 204b, 204c, 204n. Each user 204a, 204b, 204c, and 204n may use one or more user devices such as, for example, mobile device 206, tablet computer 208, laptop computer 210, and/or display device 212. Although four users 204a, 204b, 204c, 204n are shown, any suitable number of users may be part of the environment 200. Also, although each user 204a, 204b, 204c, 204n shown in FIG. 2 is associated with a particular device (such as mobile device 206 associated with user 204a, tablet computer 208 associated with user 204b, display device 212 associated with user 204c, and laptop computer 210 associated with user 204n), each user 204a, 204b, 204c, 204n may use additional user devices or fewer user devices from what is shown. Additionally, each user 204a, 204b, 204c, 204n may use different user devices apart from what is shown in environment 200 of FIG. 2.

Image capture device 116 may perform the various utilities described herein including, for example, automatic object segmentation in image data. As shown and described, image capture device 116 may comprise one or more digital camera modules 144, one or more depth sensors 146, one or more processors 148, and/or one or more memories 150. Although not depicted in FIG. 2, image capture device 116 may also comprise one or more infrared sensors and/or one or more image filters used for image processing. In some examples, the memory 150 may store images captured by the one or more digital camera modules 144, or received from the various user devices, as well as instructions for image data segmentation, as described herein. In some examples, the various components 144, 146, 148, and/or 150 of the image capture device 116 may be at a common geographic location and/or may be distributed across multiple geographic locations. For example, one or more processors 148 effective to perform image processing of image data captured by image capture device 116 (e.g., object segmentation of image data) may be implemented in whole or in part as a cloud or Software as a Service (SaaS) system. In some examples, the image capture device 116 may perform object segmentation of image data, etc. on images received from multiple different users 204a, 204b, 204c, 204n (e.g., via their associated cameras, computing devices, or other devices). In various other examples, image capture device 116 may perform object segmentation of image data and various other image processing techniques described herein using image data captured locally by the one or more digital camera modules 144. Various user devices (such as mobile device 206 associated with user 204a, tablet computer 208 associated with user 204b, display device 212 associated with user 204c, and laptop computer 210 associated with user 204n) may include a companion application effective to send instructions to image capture device 116. For example, user 204a may execute a companion application on mobile device 206 and may send commands to image capture device 116. In various examples, user 204a may use the companion application to capture image data with image capture device 116 and to segment various objects represented in the captured image data (e.g., objects of interest) from other objects represented in the captured image data (e.g., background objects).

The various components of the environment 200 may be in communication with one another via a network 104. As described previously, the network 104 may be and/or comprise any suitable wired or wireless network configured according to any suitable architecture or protocol. In some examples, the network 104 may comprise the Internet.

User devices, such as mobile device 206, tablet computer 208, display device 212, and laptop computer 210 may be utilized to control image capture device 116 to capture still and/or video images. In various examples, user devices may execute a companion application to control operation of image capture device 116 and/or display device 120 (e.g., a projector device). Similarly, in some examples, user devices such as mobile device 206, tablet computer 208, display device 212, and laptop computer 210 may be utilized to send image data captured by and/or processed by image capture device 116 to integrated or external display devices for display. For example, image capture device 116 may comprise a short throw projector device (not shown in FIG. 2). A user device such as tablet computer 208 may be effective to send an instruction to image capture device 116 (e.g., through a companion application) to send image data to the short throw projector device for display.

In some examples, user devices including mobile device 206, tablet computer 208, display device 212, and/or laptop computer 210 may be configured to communicate with other components of the environment 200 utilizing, for example, a wired or wireless connection. For example, mobile device 206, tablet computer 208, display device 212, and/or laptop computer 210 may send and receive data (such as, for example, commands and/or image data) via a wired connection, such as Universal Serial Bus (USB), or wireless connection, such as near field communication (NFC) or Bluetooth. In some examples, the user devices may be configured to receive still images and/or video directly from image capture device 116, for example, via the network 104. Although user devices are described as mobile device 206, tablet computer 208, display device 212, and/or laptop computer 210, the user devices may be any suitable type of computing device comprising at least one processor and non-transitory computer-readable memory. In some examples, the user devices may be configured to receive image frames captured by the image capture device 116. In some examples, the user devices, such as mobile device 206, tablet computer 208, display device 212, and/or laptop computer 210, may be configured to communicate on a cellular or other telephone network.

In various examples, users, such as users 204a, 204b, 204c, 204 may control image capture device 116 using audible commands. For example, a user 204a may speak a "wake word" that may be a spoken, audible command. A wake word may be, for example, a word or phrase for which a wake word engine of image capture device 116 continually listens. A microphone of image capture device 116 may detect the spoken wake word and, in response, subsequent audio captured by the microphone may be processed to detect further audible commands and/or the subsequent audio received by the microphone of image capture device 116 may be transmitted to a voice recognition server 220. In the example, user 204a may "wake" the image capture device 116 to further voice commands using the wake word, and may thereafter speak an audible command for image capture device 116 to take a video or take a picture. Similarly, a user may speak an audible command for image capture device 116 to segment image data representing a particular object in the image or video from other image data. For example, a user may speak an audible command for the image capture device 116 to segment image data representing an article of clothing from image data representing the remainder of the captured image or vide. Audio may be transmitted/streamed from image capture device 116 over network 104 to voice recognition server 220 in any audio file format, such as mp3, mp4, or the like. Voice recognition server 220 may receive the transmitted or streamed audio. Upon determining that the audio content has reached an endpoint, voice recognition server 220 may analyze the received audio stream and may translate the audio stream into natural language. Voice recognition server 220 may determine whether or not the natural language corresponds to a command. If so, the voice recognition server 220 may send the command over network 104 to image capture device 116. For example, a user 204a may speak the command, "Take a picture" to image capture device 116. Image capture device 116 may transmit the voice command to voice recognition server 220. Voice recognition server 220 may analyze the audio stream and may translate the audio stream into natural language. Voice recognition server 220 may determine that the natural language "Take a picture" corresponds to a command effective to instruct image capture device 116 to capture an image using digital camera module 144 and/or depth sensor 146. Voice recognition server 220 may send the command over network 104 to image capture device 116. The command may be effective to cause image capture device 116 to capture an image.

In other examples, a user 204a may speak the command, "clothing photo" (or another audible command) to image capture device 116. Image capture device 116 may transmit the voice command to voice recognition server 220. Voice recognition server 220 may analyze the audio stream and may translate the audio stream into natural language. Voice recognition server 220 may determine that the natural language "clothing photo" corresponds to a command effective to instruct image capture device 116 to segment image data representing clothing from other image data in a selected image. In various examples, the selected image may be stored in memory 150 or may be stored in a different memory accessible by image capture device 116 over network 104. Voice recognition server 220 may send the command over network 104 to image capture device 116. The command may be effective to cause image capture device 116 to access and perform the image processing operations related to segmentation of the clothing from the background image data, as described in further detail below.

In some embodiments, the microphone for capturing voice commands may be a far field microphone. In some embodiments, the microphone may be provided on a different device separate from the image capture device 116. The processing of the voice command and/or transmission of the audio to the voice recognition server 220 may similarly be performed by a device other than the image capture device 116.

In various examples in which the various image processing techniques (e.g., object segmentation in image data) are implemented at least in part in a cloud service or SaaS environment, such techniques may be performed at an image processing device 230. Although depicted as different computing devices in FIG. 2, in some examples, image processing device 230 and voice recognition server 220 may be implemented in the same housing. Similarly, in various examples, image processing device 230 may be implemented in the same housing as image capture device 116. In yet other examples, image processing device 230 may receive image data captured by image capture device 116 via network 104. After performing image processing in accordance with the various techniques described herein, image processing device 230 may send transformed image data over network 104 to image capture device 116 and/or to one or more user devices and/or other computing devices, such as, for example, a social media server. In some examples, processed image data may be sent to a computer vision system (not shown). The computer vision system may be programmed to recognize various features of an object or subject depicted in the processed images. For example, the computer vision system may be programmed to recognize a face of a subject, a type, category, brand, or designer, of clothing, etc. Clothes may be identified by matching a particular item of clothing segmented from other image data or otherwise tagged within image data to a particular item of clothing known to have been purchased by the user of image capture device 116 or stored in a database, such as an online-shopping catalog database. For example, the computer vision system may be in communication with one or more other computing systems that include profile information related to the subject. The computer vision system may identify particular articles of clothing worn by a subject by querying other computer systems, such as a server of an online-shopping website from which the user has purchased those articles of clothing. Similarly, the computer vision system may identify a subject by querying a computer system hosting a social media platform, which can provide to the computer vision system information about the subject (e.g., information about clothing purchased by the subject, worn by the subject in photos available to the social media platform, owned by the subject from a virtual wardrobe created by the subject, or other types of information available to social media platforms or made available to the computer vision system) to assist with the identification of that clothing by the computer vision system. In various examples, the computer vision system may be effective to insert metadata into the perspective-transformed image. In some examples, such metadata may be optionally displayed when image data is projected by image capture device 116. The metadata may comprise a metadata "tag," or a hyperlink that, which selected by the user, will direct the user to a retail website where the particular article of clothing can be purchased. Additionally, image processing techniques, such as the object segmentation techniques for image data described herein, may be used to isolate and label clothing image data to build databases of clothing image data.

Figure 3:
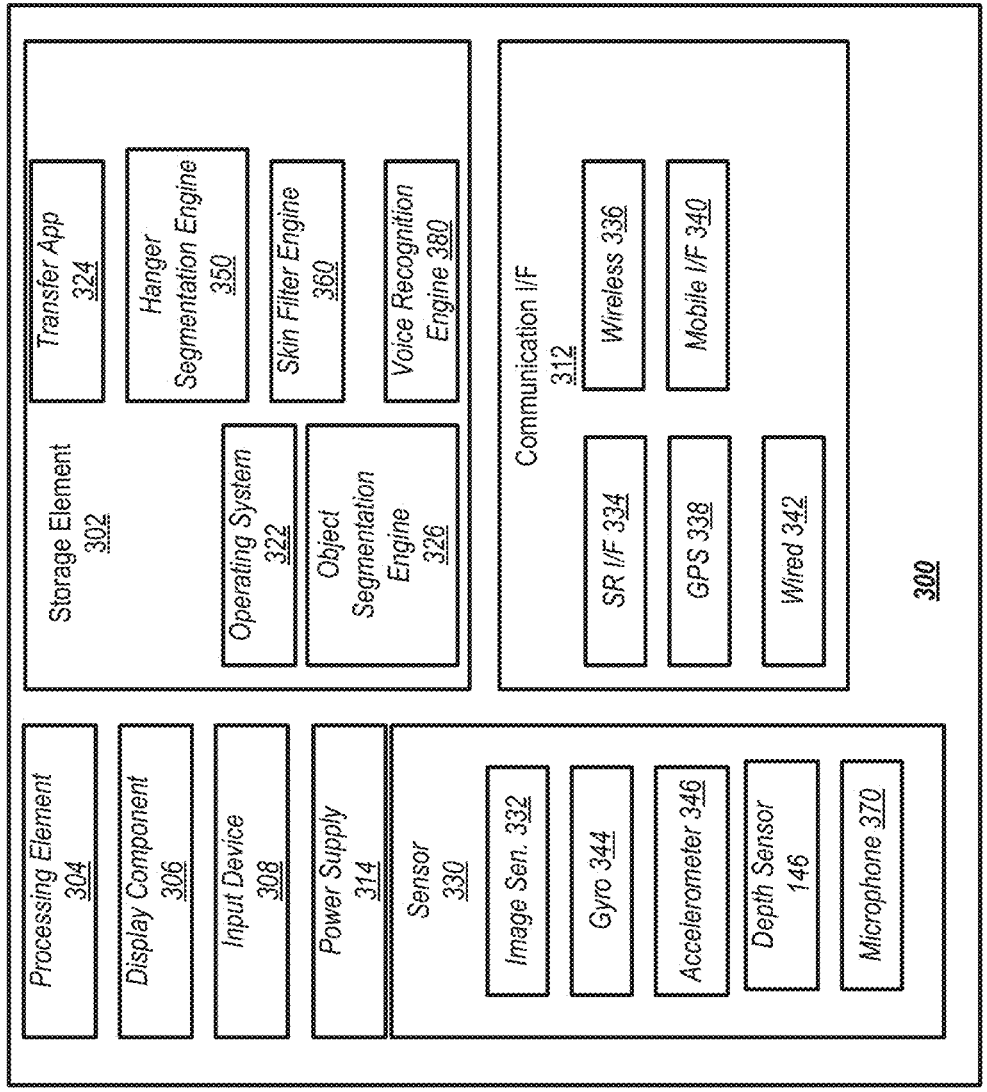
FIG. 3 is a block diagram showing an example architecture of a computing device in which the image capture system described in the present disclosure, or a portion thereof, may be implemented, in accordance with various embodiments described herein.

FIG. 3 is a block diagram showing an example architecture 300 of a user device, such as the image capture devices, cameras, display devices, mobile devices, and/or other computing devices described herein. It will be appreciated that not all user devices will include all of the components of the architecture 300 and some user devices may include additional components not shown in the architecture 300. The architecture 300 may include one or more processing elements 304 for executing instructions and retrieving data stored in a storage element 302. The processing element 304 may comprise at least one processor. Any suitable processor or processors may be used. For example, the processing element 304 may comprise one or more digital signal processors (DSPs). In some examples, the processing element 304 may be effective to perform object segmentation techniques for image data, as described above. The storage element 302 can include one or more different types of memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc.

The storage element 302 may also store software for execution by the processing element 304. An operating system 322 may provide the user with an interface for operating the user device and may facilitate communications and commands between applications executing on the architecture 300 and various hardware thereof. A transfer application 324 may be configured to send and/or receive image and/or video data to and/or from other devices (e.g., a mobile device, image capture device, and/or display device). In some examples, the transfer application 324 may also be configured to upload the received images to another device that may perform processing as described herein (e.g., a mobile device, another computing device, and/or image processing device 230).

In various examples, an object segmentation engine 326 may be effective to use depth data and color domain data to segment various image data representing objects of interest from other image data in a particular image frame. Processing techniques of object segmentation engine 326 are described in further detail below. Hanger segmentation engine 350 may be an image processing software module effective to employ directional filters to filter out image data that is oriented in particular spatial arrangements. Hanger segmentation engine 350 may use depth information generated by depth sensor 146 to generate a two-dimensional binary mask. Pixels of the binary mask may be labeled as either background or foreground. In various examples, the binary mask may be generated from the main blob of depth data after performing the histogram thresholding operation described above. In various examples, hanger segmentation engine 350 may be effective to remove image data from the binary mask. For example, hanger segmentation engine 350 may be effective to remove image data that represents clothing hangers from other image data. Various example processes that may be employed by hanger segmentation engine 350 are described in further detail below.

Similarly, skin filter engine 360 may be effective to filter out image data corresponding to the skin of a human wearing or holding a particular article of clothing from the image data corresponding to the article of clothing. As described in further detail below, the skin filter engine 360 may compare color values of pixels within a particular spatial region of the image data to an empirically-generated skin color database. For a particular pixel, the color value of the pixel may be compared both to color values within the skin color database as well as to color values of nearby pixels of the article of clothing to determine similarities. Pixels determined to be "skin" based on similarity to the color values in the skin color database may be filtered from the image using techniques described in further detail below in order to segment the image data representing the article of clothing from other image data. The skin color database may comprise color values associated with common human skin tones. In various examples, the color values of the skin color database may be empirically determined. The skin color database may be updated over time.

When implemented in some user devices, the architecture 300 may also comprise a display component 306 (e.g., display 120 depicted in FIG. 1B). The display component 306 may comprise one or more light-emitting diodes (LEDs) or other suitable display lamps. Also, in some examples, the display component 306 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 for capturing sounds, such as voice commands. Voice recognition engine 380 may interpret audio signals of sound captured by microphone 370. In some examples, voice recognition engine 380 may listen for a "wake word" to be received by microphone 370. Upon receipt of the wake word, voice recognition engine 380 may stream audio to a voice recognition server for analysis, as described above in reference to FIG. 2. In various examples, voice recognition engine 380 may stream audio to external computing devices via communication interface 312.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other user devices such as the user devices depicted in FIG. 2 (including mobile device 206 associated with user 204a, tablet computer 208 associated with user 204b, display device 212 associated with user 204c, and laptop computer 210 associated with user 204n). For example, the communication interface 312 may comprise a wireless communication module 336 configured to communicate on a network, such as the network 104, according to any suitable wireless protocol, such as IEEE 802.11 or another suitable wireless local area network (WLAN) protocol. A short range interface 334 may be configured to communicate using one or more short range wireless protocols such as, for example, near field communications (NFC), Bluetooth, Bluetooth LE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol. In various examples where architecture 300 represents image capture device 116 (shown in FIG. 1B), mobile interface 340 may allow image capture device 116 to communicate with one or more other computing devices such as the various computing devices shown in FIG. 2. For example, image capture device 116 may receive a command from a user device, an application of a user device, or a voice recognition server to capture an image. Image capture device 116 may receive a command from the user device to send the captured image frame to the mobile device or to a social media site.

The architecture 300 may also include one or more sensors 330 such as, for example, one or more position sensors, image sensors, and/or motion sensors. An image sensor 332 is shown in FIG. 3. Some examples of the architecture 300 may include multiple image sensors 332. For example, a panoramic camera system may comprise multiple image sensors 332 resulting in multiple images and/or video frames that may be stitched and may be blended to form a seamless panoramic output.

Motion sensors may include any sensors that sense motion of the architecture including, for example, gyro sensors 344 and accelerometers 346. Motion sensors, in some examples, may be used to determine an orientation, such as a pitch angle and/or a roll angle, of image capture device 116 and/or display 120 (shown in FIG. 1B). The gyro sensor 344 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 346 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 338 may be utilized as a motion sensor. For example, changes in the position of the architecture 300, as determined by the GPS interface 338, may indicate the motion of the GPS interface 338. Depth sensor 146 may be effective to determine a distance between image capture device 116 and a surface detected by depth sensor 146. In some examples, the depth sensor 146 may determine the contours of the surface and may be capable of using computer vision techniques to recognize facial patterns or other markers within the field of view of the depth sensor 146's infrared sensor. In some examples, the depth sensor 146 may include an infrared projector and camera. Processing element 304 may build a depth map based on detection by the infrared camera of a pattern of structured light displayed on a surface by the infrared projector. In some other examples, the depth sensor 146 may include a time of flight camera that may compute distance based on the speed of light by measuring the time of flight of a light signal between a camera of the depth sensor 146 and a surface of environment 100 (shown in FIG. 1B) In some examples, processing element 304 may be effective to determine the location of various objects in the physical environment within the field of view of image capture device 116 based on the depth map created by the depth sensor 146. As noted above, in some examples, non-infrared depth sensors, such as passive stereo camera pairs, or non-identical camera pairs, may be used in image capture device 116 in place of, or in addition to, infrared light sources of depth sensor 146. Processing element 304 may build a depth map based on detection by non-infrared depth sensors of a pattern of light displayed on a surface by a light source. Processing element 304 may be effective to determine the location of various objects in the physical environment within the field of view of image capture device 116 based on the depth map created by one or more non-infrared depth sensors.

Image segmentation poses a challenging problem in computer vision (CV). For example, it is challenging to obtain pixel level accurate segmentation of objects and humans (figure ground separation) relative to background image data. Even in constrained environments, where the background is partially known (e.g. bin picking) or can be obtained using additional images, obtaining an accurate segmentation is highly challenging.

Although recent advances in deep learning and convolutional neural network (CNN) processing have shown significant improvements in semantic image segmentation, such techniques are often quite demanding in terms of run-time and/or memory resources. It can pose a challenge to run image segmentation using a relatively low-powered, low memory, embedded system while maintaining a low latency output. For example, in some examples, image capture device 116 may include a microprocessor of limited speed and/or graphical processing capability. However, the techniques described herein may produce high quality image segmentation output at low latency even with limited graphical processing power. Additionally, while in some examples cloud computing may be used to enhance or speed up the image segmentation techniques described herein, in at least some other examples, image segmentation may be performed entirely on-device. For example, processor 148 of image capture device 116 (depicted in FIG. 1B) may execute the image segmentation techniques described below.

In an example, a graphics processing unit (GPU) of processor 148 of image capture device 116 may comprise 84 compute units running at about 500 MHz with boost clock. By contrast, the TITAN X GPU by NVIDIA Corporation of Santa Clara, Calif., has approximately 3000 CUDA cores (compute units) running at 1531 MHz with boost clock. In the illustrated embodiment, the GPU of image capture device 116 has about 100 times less computation power than NVIDIA TITAN X. In terms of CPU processing, the image capture device 116 in this example may have a CPU that is 4 times slower than a standard desktop computing device with 16 GB RAM and a Core i7 microprocessor by Intel Corporation of Santa Clara, Calif. It should be appreciated that image capture device 116 may include any type of processor and/or memory. The examples described above are mentioned merely to illustrate that the low latency image segmentation techniques described herein may be performed without high end GPUs, fast processing units, and large amounts of memory.

In some examples, CNN-based approaches may require large amounts of memory to store the CNN model and intermediate layer results in a forward pass. Densely Connected Convolutional Networks (DenseNet) architecture may be used to reduce network size, but some embodiments of the present invention may perform these processing methods using less than 150 MB available for CV processing.

Image Segmentation Techniques

Classical CV segmentation approaches uses a MRF/CRF framework (Markov random field/conditional random field), where the energy (cost) of segmentation is defined as:

$$E(x)=\Sigma\Phi_i(x_i,y_i)+\Sigma\Phi_{ij}(x_i,x_j,y_i,y_j)$$

where x denotes pixels and y denotes the labeling of each pixel. For binary segmentation, labels for pixels are "foreground" or "background." Pixels may be encoded, classified, or otherwise labeled as either "foreground" or "background" by encoding the pixels with foreground indicator data or background indicator data. Foreground indicator data and background indicator data may comprise one or more bits that indicate the label of the pixel. The energy terms are dependent on the labels. $\Phi_i(x_i,y_i)$ denotes the cost of a pixel $x_i$ taking the label $y_i$. Popular approaches include learning filters (RGB domain) that can give a good local estimate of probability of foreground vs background. Other approaches my utilize deep learning and CNN to learn these filters and obtain the local estimates using learned filters.

The clique potential $\Phi_{ij}(x_i,x_j,y_i,y_j)$ denotes the cost of neighboring pixels taking different labels. In order to minimize the energy, an inference algorithm is used. Graph-cuts is an inference algorithm that can provide a global optimum under sub-modular cost functions. However, inference for Graph-cuts is computationally expensive and has difficulty incorporating higher-order clique potentials and long range interactions between pixels.

Gaussian conditional random fields (GCRFs) may be used to model the segmentation problem and can lead to fast inference. GCRFs can also be motivated from a quadratic cost function point of view. In some examples, the segmentation problem may be formulated as a quadratic optimization. Local probabilities may be computed for each pixel using a graphical model. The local probabilities may be refined using a non-local graph structure in the color (RGB) image. Instead of modeling the segmentation as a binary variable (0 or 1), the segmentation model may instead be modeled as a continuous variable between 0 and 1 using multi-matting techniques. The energy of the system may then be modeled as a quadratic least square function, which leads to a sparse linear system. Accordingly, the inference can be done in a fast manner.

The segmentation techniques described below may be used to reduce latency while executing with a low computational budget. Designing a large energy minimization problem where inference is run for each pixel is prohibitive. Instead, a cascade approach is used, which allows for an initial quick and low-cost inference for the majority of pixels followed by successively refined "foreground" or "background" label estimates for the remaining pixels. For example, if an efficient human detector algorithm is used, pixels which are spatially away from the detected human and have a large depth difference from the detected human pixels may be labeled as "background" without running an expensive inference. Pixels near the boundary of human/background boundary may require more computationally expensive inference.

A cascade of classifiers as well as additional local cues may be used to assign probabilities $\Phi(x)$ to each pixel using depth data generated by depth sensor 146 and color data generated by digital camera module 144. These classifiers may be learned using labeled images, where each pixel in the color image is labeled as foreground or background. Since the geometric calibration between the digital camera module 144 and depth sensor 146 is known, the depth image may be mapped to the color image coordinate system. Therefore, the foreground/background labels of the labeled color image may be applied to the corresponding pixels in the depth image.

Advantages to using multiple classifiers as compared to designing a single classifier to classify each pixel may include: (a) classifiers may be relatively simple; (b) classifiers can be trained with less data; and (c) a better tradeoff between false positives and false negatives may be realized using multiple classifiers. By contrast, a single classifier may require a very low false positive and false negative rate, and may therefore require a larger amount of training data.

Classifier Training and Cascade Approach

Notations—

Each capture of image data by image capture device 116 generates a color image $I(x)$, a depth image $Z(x)$, and an infrared image $IR(x)$, where x denotes a pixel. Let $\alpha(x)$ denote the continuous segmentation value for each pixel, with a value of 1 for a foreground label and −1 for a background label. Pixels with no depth information (e.g., pixels for which no depth data is provided by the depth sensor 146, sometimes referred to as "depth holes" have $Z(x)=0$.

Depth Image Pre-Processing—

The depth image $Z(x)$ may be denoised using a median filter. Small holes (e.g., clusters of pixels with no depth information) may be filled via guided interpolation using the IR image. In some examples, small holes may be selected for filling based on the size of the holes. For example, clusters of depth holes that have no dimensions greater than 15 pixels in length may be considered a small hole and may be filled using guided interpolation techniques described herein. The guided interpolation filling technique may be formulated as a weighted Poisson equation on a 4-connected graph. The weight between two neighboring unknown depth pixels is derived using the difference in the corresponding IR values. This leads to a sparse linear system with known depth values on the boundary of the small holes acting as Dirichlet boundary conditions.

Since a human subject (e.g. subject 110 depicted in FIG. 1B) standing on a floor is connected to the floor in the depth data, the floor plane (ground plane) is first removed to segment the subject from the surroundings. The floor plane may be a lower surface of an environment in which the image capture device 116 and/or the subject 110 is located. The floor may be removed using RANSAC on the depth image to identify the ground plane. The pixels identified as the ground plane (e.g., the floor) may be removed (e.g., deleted) from the depth frame. A connected component analysis may be executed on the remaining depth data to over-segment the depth data into clusters of pixels (sometimes referred to herein as "blobs"). This results in N clusters in the depth image frame. Note that depth holes (depth value of 0) form separate blobs and a "hole blob" can span both foreground and background.

The over-segmentation technique described above reduces the dimensionality of the problem. For example, for a VGA image, instead of classifying each pixel (307K pixels) as foreground or background, we can classify blobs which typically comprise a few thousand pixels. The image segmentation techniques may proceed to (a) main blob (foreground) selection; and (b) blob classification with valid depth data; and (c) depth hole classification.

Main Blob/Cluster Selection

Figure 4A:
FIG. 4A depicts a depth image before main blob selection and the depth image after main blob selection, in accordance with various aspects of the present disclosure.
Figure 4A:
Figure 4A:
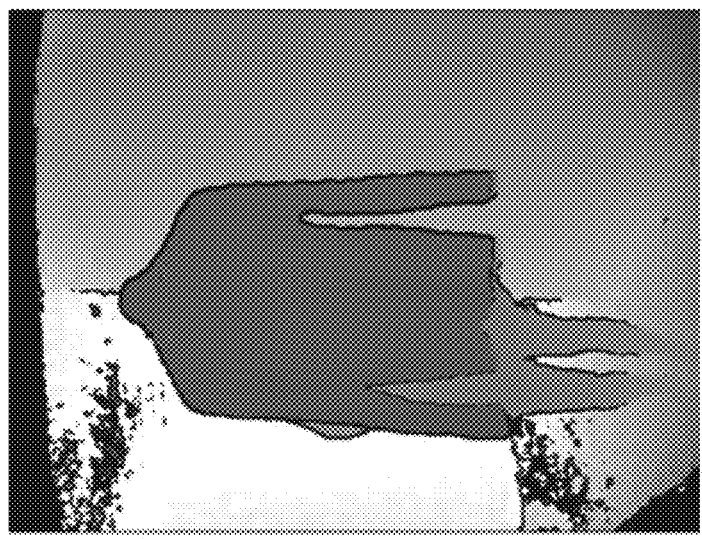

FIG. 4A depicts a depth image 402 representing a human holding a shirt. In depth image 404 a main blob has been selected in accordance with the various techniques described herein. In depth image 404, bright white pixels correspond to pixels of the selected "main blob." As can be seen, the main blob in depth image 404 corresponds closely to the shape of the shirt, as represented in the depth images 402, 404. The main blob (or "cluster") in depth image 404 may be selected from N clusters in the depth frame after segmentation of the depth image frame 402 into a plurality of clusters (as described above).

Main blob selection is used to identify a single blob or cluster as corresponding to the object of interest. The main blob is labeled as foreground. Note that, in some cases, the object of interest may be disconnected into multiple blobs due to the over-segmentation techniques described above. In at least some examples, one or more of the various techniques for main blob selection described below may be used in order to identify the main blob. Although all of the techniques described below may be used in conjunction to identify the main blob, in some examples, a subset of the various techniques described below may be used for main blob identification, depending on the desired implementation.

Initially, a set of candidate blobs may be identified. Small blobs (e.g., blobs with a size (e.g., an area and/or particular dimensions) less than a lower threshold size, really large blobs (e.g., blobs with an area greater than an upper threshold size, and obvious background blobs may be removed from the list of candidate blobs by being labeled as "background". The upper threshold size and lower threshold size may be determine to be bounds of an expected size range of a clothing item or other object of interest. The upper threshold size and lower threshold size may be selected based on the physical sizes of objects of interest. Since the properties of the image capture device 116 are known (e.g., focal length, pitch size, etc.), the number of pixels of a surface area in the image plane is known. Blob sizes, in terms of a number of pixels, may be compared to the upper threshold size and lower threshold size. Only blobs with sizes between the lower threshold size and the upper threshold size may be selected as a potential candidate blob for the main blob. Blob size in pixels may be normalized by the blob's distance to the image capture device 116.

In some other examples, spatial location within the depth image may be used to select a main blob from the plurality of blobs. For example, a central window (e.g., a centrally located region of pixels) may be identified in the RGB image data captured by digital camera 144 of image capture device 116. A corresponding central window may be identified in the depth image using known differences between the depth sensor 146 and the digital camera 144 (e.g., the rotation and translation between lenses of depth sensor 146 and digital camera 144). In order for a blob to be selected as a potential candidate blob for the main blob, a significant portion of the blob being evaluated may be required to reside within the central window in the depth data. For example, a threshold amount (in terms of a number of pixels) of a blob being evaluated may be required to reside within the central window in the depth data.

Obvious background blobs may be identified based on a typical distance between a lens of image capture device 116 and a subject (e.g. subject 110 depicted in FIG. 1B). In some examples, subjects and may often be positioned within a certain distance of image capture device 116. For example, subjects may be positioned within about 2 meters of image capture device 116. In some other examples, subjects may be positioned within about 2.5 meters from image capture device 116. These distances are provided as examples only, and any desired distance may be used in accordance with the techniques described herein. In various other examples, image capture device 116 may be designed with a zoom lens, and, accordingly, the subject may be positioned further from the image capture device 116. Blobs may be identified as "obvious background blobs" when the average depth value of pixels of the blob far exceeds the average distance of the subject in a particular configuration of image capture device 116. In some examples, blobs with average depth values that are more than 2.5 m, 3.0 m, 3.3 m, 2.1 m, 1.8 m, or another desired distance, may be identified as obvious background blobs depending on the particular configuration of image capture device 116. In some other examples, blobs with average depth values that are more than 2×, 1.5×, 3×, 4×, 3.1×, etc., the average distance between the subject and the image capture device 116 may be identified as obvious background blobs, depending on the particular configuration of image capture device 116. After removal of too-small, too-large, and obvious background blobs, the number of remaining candidate blobs/objects/clusters for selection as the main blob are considerably reduced. For example, after removal of the non-candidate blobs described above (e.g., too-small, too-large, and obvious background blobs), fewer than 10 candidate blobs may remain for selection of the target main blob representing the subject. In some examples, image capture device 116 may select the blob or cluster with the lowest average depth value (e.g., the closest blob) from among the candidate blobs as the main blob.

Additionally, a comprehensive distance D may be calculated for each blob. The blob with the lowest comprehensive distance D may be selected as the main blob. In various examples, D may be calculated only for candidate blobs that satisfy the size and central location requirements described above in order to reduce latency and computational complexity. The comprehensive distance D may be given by the heuristic formula: $D = r_x * r_y * r_z * r_{size}$ where:

$$r_x = 1 + \frac{(x_{blobcentercoordinate} - x_{windowcentercoordinate})}{width_{central\,window}};$$

$$r_y = 1 + \frac{(weight_{y_{offset}})(y_{blobcentercoordinate} - y_{windowcnetercoordinate})}{height_{central\,wind}};$$

$r_z = |(blob\ distance\ to\ camera) - (min\ distance\ to\ camera)|$; and $$r_{size} = 1 + \frac{(weight_{size})(min\,blob\ size)}{blob\ size}.$$

The equations given above for calculating the comprehensive distance D models how a blob is located with respect to the central window, how close the blob is to the image capture device 116 and how large the blob is relative to a minimum object of interest size. The $weight_{y_{offset}}$ and $weight_{size}$ may be empirically determined. The blob with the smallest comprehensive distance D may be selected as the main blob.

Intuitively, it is often desirable to select the blob as the target object or "main blob" that includes one or more desired characteristics. For example, desired characteristics of the target object or main blob may include the blob which is largest in size, closest to the image capture device 116, located in near a central point in the image frame, not entirely disposed close to the ground (as the subject is unlikely to be entirely close to the ground), etc. As such, intrinsic features may be developed for selecting the main blob based on these desired characteristics.

Advantageously, since only one main blob is selected at this stage of processing, a classifier to classify all blobs (requiring high recall and high precision) need not be used. However, the above techniques may still provide highly accurate main blob selection. In some examples, the failure rate for main blob selection in accordance with the above techniques may be less than 1% on a dataset of 8000 images (99% accuracy). Note that due to the cascade approach of image segmentation described in the present disclosure, if the main blob is mis-detected, the error is irrecoverable and the segmentation process will need to be re-executed. Accordingly, a very high accuracy is needed during main blob selection.

Pixels of the selected main blob are labeled as "foreground". In various examples, no later inference may be run for the pixels within the selected main blob, significantly reducing the number of unknowns in the final inference.

Figure 4B:
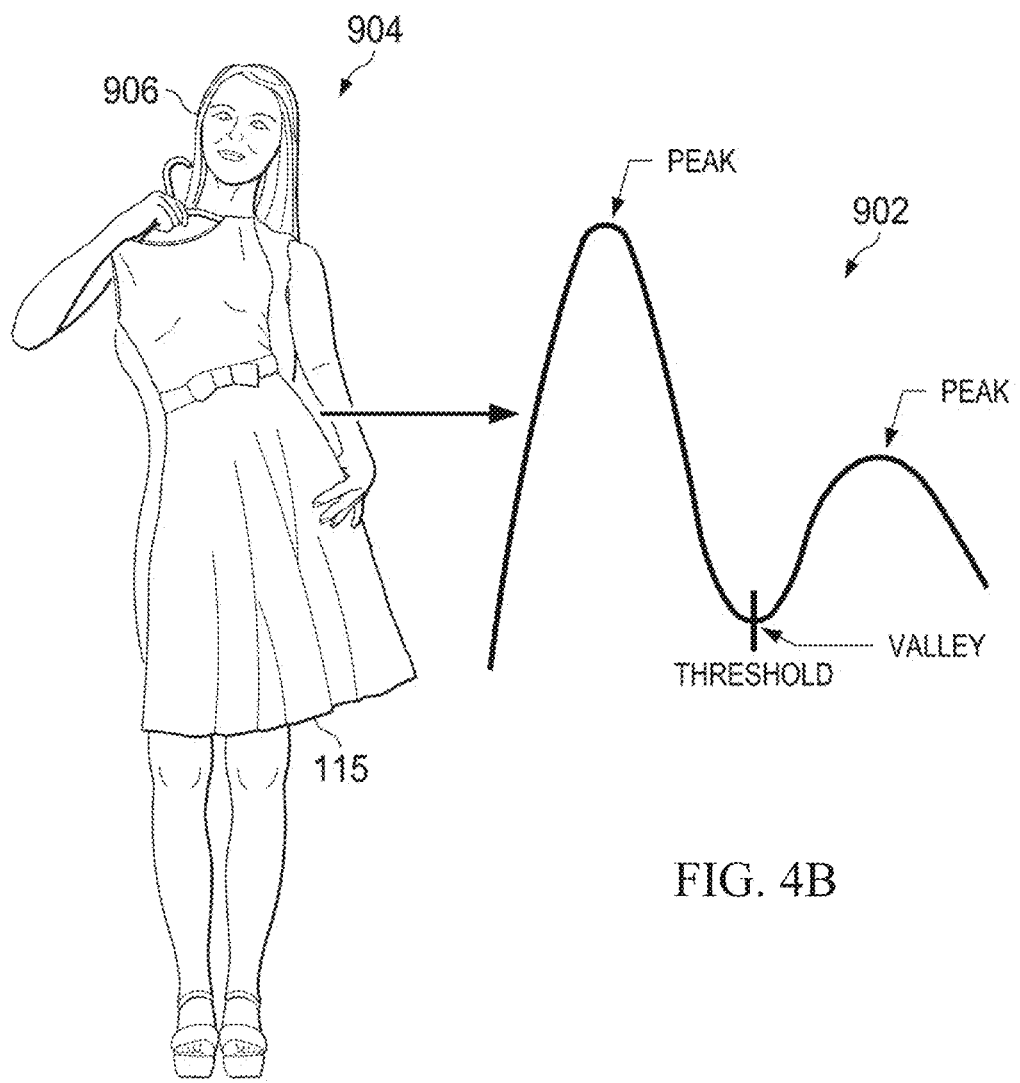
FIG. 4B illustrates a histogram thresholding technique that may be used to segment object image data, in accordance with various aspects of the present disclosure.

In examples where the main blob comprises image data representing an object of interest, a histogram thresholding technique may be applied to further separate the image data representing the object of interest from the other image data in the main blob. FIG. 4B illustrates a histogram thresholding technique that may be used to segment image data representing an article of clothing 115 from image data representing a standing human 906 holding the article of clothing.

A histogram 902 may be generated. Histogram 902 may represent depth values of pixels of the main blob 904. The histogram 902 may be used to segment the image data representing the article of clothing 115 from the image data representing the standing human 906. This is because the article of clothing 115, being held in front of the standing human 906, will have different depth values relative to the standing human 906. Two peaks may appear in the histogram 902, with one peak representing the standing human 906 and the other peak representing the article of clothing 115. The image data representing the standing human 906 may be segmented from the image data representing the article of clothing 115 by cutting between the two peaks at a threshold value (e.g., at a local minimum value) and discarding pixel values corresponding to the peak representing the standing human 906. In some examples, the threshold value may be determined by finding the two largest adjacent peaks of depth values among pixels in the main blob and locating a local minimum depth value between these two peaks. In another example, the threshold value may be defined as a percentage of the peak depth value of pixels of the main blob (e.g., 5%, 10%, 15%, 11%, 7.3%, etc.).

Figure 5:
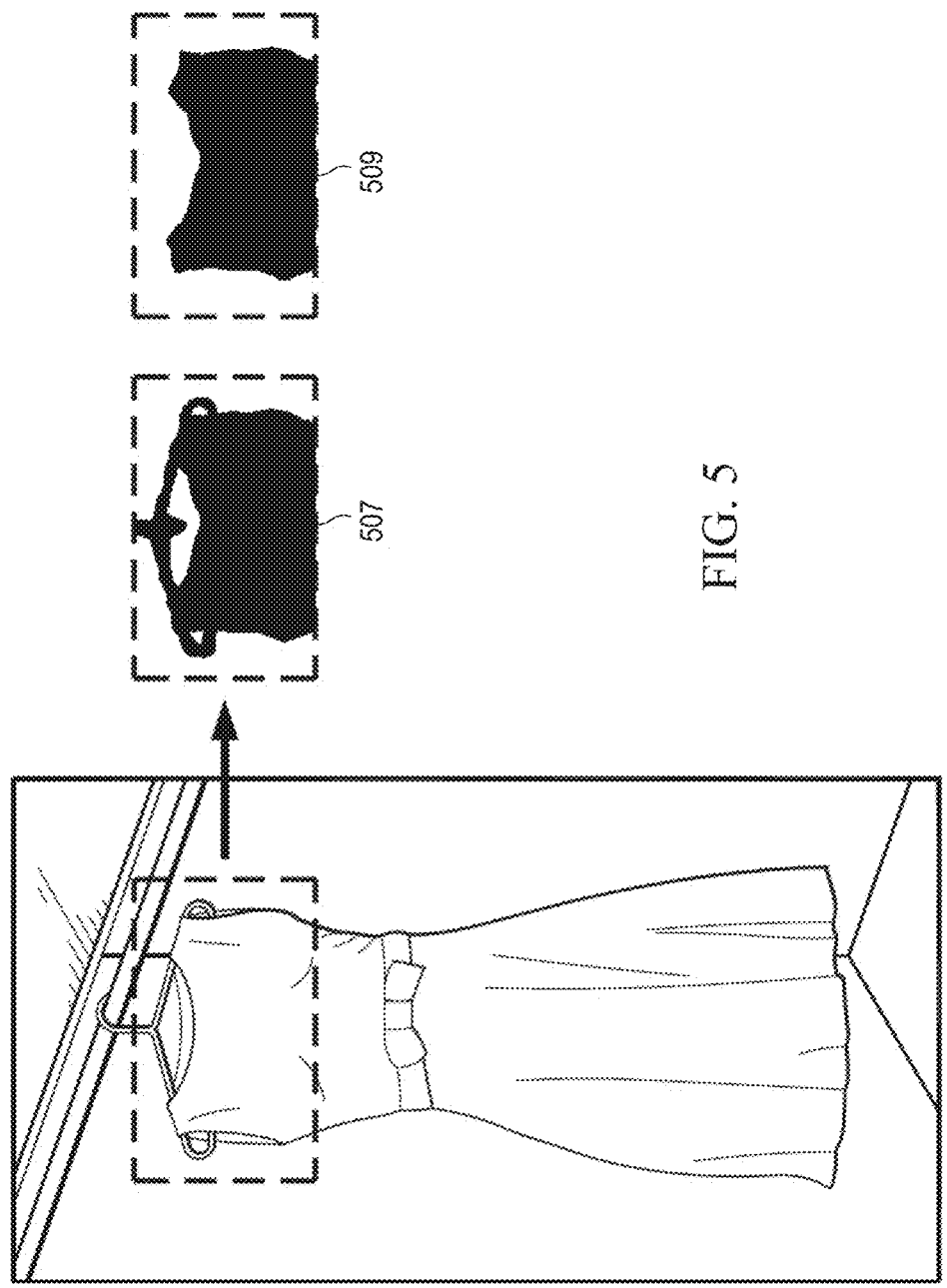
FIG. 5 illustrates a filtering technique for removing hanger image data that may be used to segment object image data, in accordance with various aspects of the present disclosure.

Continuing the example of FIG. 4B, wherein the image segmentation object of interest comprises an article of clothing, FIG. 5 illustrates a filtering technique for removing hanger image data that may be used to segment clothing image data from hanger image data, in accordance with some aspects of the present disclosure.

A two-dimensional binary mask of the depth domain image data may be generated. The binary mask may include pixels labeled as "foreground" or "background". A two dimensional directional filter may be applied to the top portion of the binary mask to perform a morphological erosion to filter out the hanger in the binary mask. The directional filter may be applied to the top 5-20% of the image data, in some examples, as the hanger will usually be disposed near the top of the image data in the binary mask. The erosion operation may include encoding pixels aligned along the direction specified by the directional filter with background indicator data, such that the pixels are labeled as background.

In various examples, only vertical directional filters may be used to filter objects at predefined angles or ranges of angles from a vertical axis of the image data being filtered. For example, the directional filters may perform a morphological erosion operation on image data that is aligned along various angles relative to a vertical axis of the image data. In some examples, the angles for the directional filters may correspond to common clothing hanger designs. In one example, the directional filters may be designed to erode image data at −30°, −15°, 15°, and 30° from a vertical axis of the image data. In other examples, the directional filter may be designed to erode image data at various other angles relative to a vertical axis of the two-dimensional binary mask. For example, the directional filter may erode image data from −45° to +45°. Additionally, increments other than 15° may be used to erode image data. For example, increments of 5°, 10°, 12.3°, or any other desired increment may be used. "Erosion" of image data may include setting pixels to a local minimum value. In the case of a binary mask, the erosion operation performed by the directional filter may set values of pixels located at the angles specified by the directional filter to values of 0. Use of vertical directional filters as opposed to horizontal directional filters may avoid erosion filtering of thin straps of some articles of clothing. For example, a dress may hang from a hanger by thin, vertically oriented straps. A horizontal directional filter may filter out image data representing the vertical straps, while a vertically oriented directional filter may filter out hanger image data removing image data representing clothing straps.

Background Environment Prior

In various examples, image capture device 116 may be used indoors in a home environment. Further, image capture device 116 may be placed in a desired location by a user (e.g., in a user's home, business, or other location) and may build a background model based on that location. In some examples, depth sensor 146 may have difficulty generating valid depth data for far away backgrounds (e.g., beyond 3.5 m, 4 m, 5 m, etc. depending on the particular depth sensor used) and for areas with strong sunlight. Indoor, man-made environments are often characterized by straight lines in the scene (e.g., walls, doorways, ceilings, floors, counters, tables, surfaces, etc.). This fact can be leveraged using a background prior to detect long straight lines in the scene and label pixels representing such lines as background. Since long, straight lines can also occur in image data on a human subject, the background detection prior may be conditioned on the main blob selection. Accordingly, long straight lines close to the main blob may be ignored (e.g., within k pixels of the main blob, where k is an adjustable design parameter). Let $L(x)$ denote the pixels x corresponding to long straight lines in the scene.

$$P_{BGLines}(x)=0 d_{fg}(x)>\alpha, x \in L(x)$$

where $d_{fg}(x)$ is the distance from the known foreground (e.g., the main blob). Note that the background environment prior is only defined for pixels lying on detected lines.

Additional Depth Prior

The conditional classification of valid depth blobs described above is blob-based and all pixels in the blob are classified with the same value. In addition to such blob-based classification, actual depth values of pixels may be used to handle errors in classification and to have a more continuous prior. In such an additional depth prior, $\mu$ may be the mean depth of the main blob, and $Z(x)$ may be the depth of a particular pixel x. The additional depth prior may be defined as:

$$P_{Depth}(r) = \frac{f(x)}{f(x)+b(x)}$$

where $f(x)$ is the probability of being close to mean foreground depth and $b(x)$ is the probability of being close to background. $f(x)$ and $b(x)$ are defined as:

$$f(x) = \exp\left(-\frac{(z(x)-\mu)^2}{\sigma_2^2}\right)$$

$$b(x) = \max\left(\exp\left(-\frac{(\mu+i-z(x))^2}{\sigma_2^2}\right), \exp\left(-\frac{(\mu-t-z(x))^2}{\sigma_2^2}\right)\right)$$

where t is an offset in mm. Accordingly processor 148 of image capture device 116 may determine whether the pixel depth $Z(x)$ is close to mean depth $\mu$ or away from mean depth $\mu$ based on $\sigma_2$. $\mu+t$ may be used to represent far backgrounds and $\mu-t$ may be used to represent closer depths away from mean depth. The maximum over ($\mu+t$) and ($\mu-t$) may be determined for computing $b(x)$. For humans, considering span of humans in depth, reasonable values may be $t=800$ mm and $\sigma_2=600$ mm, although different values may be used.

In summary, local probabilities of pixels may be obtained using the learned classifiers background prior $P_{BGLines}(x)$ and prior $P_{Depth}(x)$. $\lambda_1$ and $\lambda_2$ may be defined as the weights of $P_{BGLines}(x)$ and $P_{Depth}(x)$. In various examples, weights $\lambda_1$ and $\lambda_2$ may be learned and tuned using training data.

Skin Color Filter

It may be expected that when a user holds up an article of clothing for image capture, most of the user's body will be farther from the image capture device than the article of clothing, due to the extension of the user's arm when holding up the clothing. These more distant portions can be segmented from the article of clothing using the depth-based segmentation methods described above. However, a portion of the user's hand holding the article of clothing may overlay a portion of the clothing and therefore be positioned at approximately the same distance from the image capture device as the article of clothing. In this case, the depth-based segmentation methods may not be as effective in segmenting the person's hand from the clothing being held. In accordance with some embodiments, a skin color filter may be used to identify the user's hand and improve the segmentation of the user from the clothing.

Figure 6:
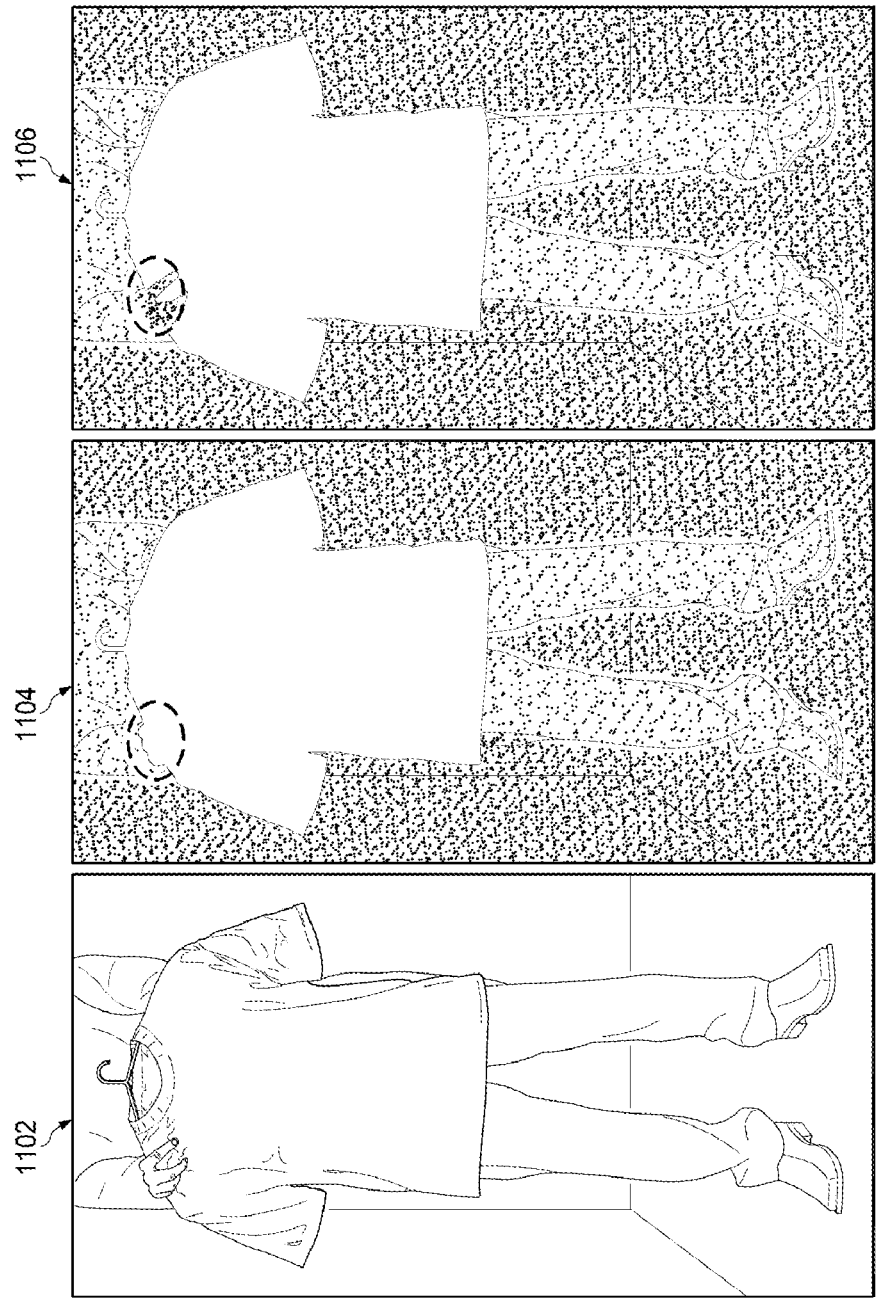
FIG. 6 illustrates a skin color filtering technique for removing skin image data that may be used to segment object image data, in accordance with various aspects of the present disclosure.

As previously described, the color image data may be mapped on a pixel-to-pixel basis to the depth data based on calibration information and based on the known positions of the digital camera module 144 and the depth sensor 146 in image capture device 116. In various examples, a skin color filter may be applied when the image capture device 116 is in an object segmentation mode. FIG. 6 illustrates a skin color filtering technique for removing skin image data. In various examples, the skin color filtering may be used to segment object image data, in accordance with various aspects of the present disclosure.

For example, a user of image capture device 116 may want to segment image data representing an article of clothing being held by the user from image data representing the user's hand holding the article of clothing. In some examples, the user may select an object segmentation mode, clothing segmentation mode, etc., from an interface used to control image capture device 116. In various other examples, the image capture device 116 may automatically execute the skin filter based on a determination that an object is being held in front of a human subject in the image data.

A person holding up an article of clothing will most often hold a portion around the top edge of the clothing and allow the rest of the article of clothing to dangle downwards. In this case, it may be desirable to focus the skin color filter to only the top portion of the article of clothing. Accordingly, color values for pixels near the top of the object of interest (e.g., article of clothing 115 depicted in FIG. 1A) may be compared to skin color values in a skin color database. For example, the skin color filter may be applied only to pixels in the top 5-20% of the image data representing the article of clothing (e.g., the main blob or a portion of the main blob) in order to conserve computational resources. As previously described, the image data representing the article of clothing may be separated from the other pixels in the main blob using histogram-thresholding techniques and/or the various other image segmentation techniques described herein.

A histogram of pixel color values may be generated for pixels in the top portion of the object of interest (e.g., the article of clothing in the main blob). The color value of each pixel may be compared with the skin color values in the skin color database to determine similarities. Additionally, the color value of each pixel may be compared with other color values of pixels in the portion of the object of interest (e.g., color values of image data representing the top portion of the article of clothing). If the color value of a pixel corresponds more closely to a skin color value from the skin color database relative to the color values of the object of interest, the probability that the pixel corresponds to "background" may be increased. As such, the likelihood that the inference techniques described below will classify the pixel as background is increased. If the color value of a pixel is more similar to a color value from the object of interest relative to skin color values from the skin color database, the probability that the pixel corresponds to "foreground" may be increased. As such, the likelihood that the inference techniques described below will classify the pixel as foreground is increased.

In the example depicted in FIG. 6, original image data 1102 is depicted on the left. The original image data 1102 depicts a person holding a t-shirt on a hanger. A quad map 1104 is generated of the image data using depth data from depth sensor 146 (depicted in FIG. 1B). In the quad map, pixels that are determined to be part of the object of interest (e.g., the clothing item) are encoded with one or more bits representing the label—"definite foreground". It may be determined that a pixel corresponds to the object of interest based on, for example, the histogram thresholding technique and other depth domain processing techniques described herein. Similarly, in the quad map, pixels that are determined to be part of the background are encoded with one or more bits representing the label—"definite background". It may be determined that a pixel corresponds to the background in an image based on, for example, a depth value exceeding a threshold value, as well as other depth domain processing techniques described herein. Pixels that are determined, using the various probabilistic depth domain processing techniques described herein to be more likely part of the foreground than part of the background may be encoded with one or more bits representing the label—"probable foreground" in the quad map. Similarly, pixels that are determined to be more likely part of the background than part of the foreground may be encoded with one or more bits representing the label—"probable background" in the quad map. It is to be understood that the term "definite" as used herein with respect to the classification of the pixels does not indicate an absolute certainty that the pixel corresponds to either the foreground or background. Instead, the term "definite" is used to informally indicate that the pixel is classified as foreground or background with a predetermined level of certainty or likelihood.

Quad map 1104 represents a quad map of image data 1102 prior to execution of the skin color filtering technique described herein. As shown in quad map 1104, the portion of the image data corresponding to the subject's fingers is represented using the bright white color, indicating that the fingers are labeled "definite foreground". Using the skin color filtering technique described above, image capture device 116 may map the color image data of original image data 1102 to the quad map 1104. Image capture device 116 may generate a color value histogram for pixels in the top portion (e.g., top 20%) of pixels labeled in quad map 1104 as "definite foreground". Image capture device 116 may determine that the pixels corresponding to the human fingers in original image 1102 comprise color values that match skin color values stored in a skin color database more closely than color values corresponding to other pixels of the object of interest (e.g., the t-shirt in FIG. 6). Accordingly, the pixels corresponding to the human fingers may be encoded with one or more bits representing the label "probable background". As shown in quad map 1106, the pixels corresponding to the human fingers appear a dark gray, representing "probable background", instead of the bright white representing "definite foreground". Setting pixels corresponding to the human fingers may result in a rough or uneven border of the segmented object of interest, as pixels representing the fingers may be set to background. As described in further detail below, border filtering techniques (e.g., color interpolation, Gaussian filtering, etc.) may be used to smooth the border of the object of interest. In various examples, a Gaussian filter may use a Gaussian function to calculate the transformation to a apply to each pixel to be blurred and/or blended. The Gaussian blur may reduce the visual clarity of high frequency components of pixel values.

Graph Structure

After obtaining foreground/background probabilities for each pixel, the probabilities may be refined using a non-local neighborhood. A graphical model for segmentation may define virtual nodes for foreground and background, respectively. Each pixel is connected to the virtual nodes $\Omega_F$ and $\Omega_B$ based on the pixel's local probability, as previously defined (e.g., $\Phi_{RGBD}(x)$). Each pixel's neighborhood includes K feature-space neighbors, which may be non-local. A non-local neighborhood may be defined using K-nearest neighbors (KNN) for each pixel, as described below.

K-Nearest Neighbors

To define the non-local neighborhood for each pixel, the K-nearest neighbors are found in a feature space. The segmentation is performed on super-pixels (sp) of size S×S, rather than for each pixel to reduce computation cost. For each super-pixel, an 8-dimensional feature vector may be defined based on the super-pixel's average color value for each channel of the color space (e.g., $\mu_L$, $\mu_A$, $\mu_B$ in the LAB color space), the standard deviation of color values in each color channel (e.g., $\sigma_L$, $\sigma_A$, $\sigma_B$ in the LAB color space), and the centroid of each super-pixel as the super-pixel's spatial location (e.g., ($\beta \times x$, $\beta \times y$)). Accordingly, an example 8-dimensional feature vector may be $f(sp_i)=(\mu_L, \mu_A, \mu_B, \sigma_A, \sigma_B, \beta \times x, \beta \times y)$. The spatial features are weighted by $\beta$ to define the influence of the non-local neighborhood. If $\beta=0$, the entire image is used for search for neighbors. Similarly, increasing the weight $\beta$ reduces the search neighborhood. The weight between super-pixels $sp_i$ and $sp_j$ is computed as:

$$W_{KNN}(i, j) = 1 - \frac{\|f(i) - f(j)\|}{K}$$

where $\| \|$ denotes the norm of the vector and K is a constant.

Inference

Processor 148 may use a quadratic cost function for inference to infer the segmentation value $\alpha(x)$ for each pixel x.

$$C(x,\alpha)=\sum_{x=1}^{N} W_{fg}(x)(\alpha(x)-1)^2+W_{bg}(x)(\alpha(x)+1)^2+\sum_{u \in N_x} W_{KNN}(\alpha(x)-\alpha(u))^2.$$

$W_{fg}(x)$ represents the combined foreground prior at pixel x, $W_{bg}(x)$ is the combined background prior at pixel x, and $N_x$ denotes the non-local neighborhood of pixel x.

The foreground prior $W_{fg}(x)$ is the weighted combination (using $\lambda_1$) of learned local depth prior $P_{Depth}(x)$. Similarly, the combined background prior is the weighted combination of background environment cues prior $P_{BGLines}(x)$ and inverse (one minus) of local and depth priors.

Solver

Processor 148 may calculate the derivative of the cost function for each pixel to generate a linear system of equations. If the neighborhood size is K, the linear system may be sparse as each pixel interacts with K pixels. Processor 148 may solve the sparse system using standard linear system libraries. For example, the sparse solver (LDLT) in the EIGEN C++ library may be used by processor 148 to solve the system.

In various examples, the linear system may be simplified in order to avoid solving for each pixel and/or for each super-pixel. For example, processor 148 may solve the linear system only for those pixels that are not classified as foreground or background in previous processing stages. For example, all pixels of the main blob have been previously classified as foreground. Pixels with very high confidence from classifiers can be set to foreground/background. For example, pixels with $\alpha(x) \geq 0.8$ may be set to foreground and pixels with $\alpha(x) \leq 0.2$ may be set to background. Processor 148 may be programmed to remove such pixels from the system in accordance with the techniques described below.

Given a final linear system over all pixels may be Ax=b. x may be written as:

$$x = \begin{bmatrix} x_{known} \\ x_{unknown} \end{bmatrix}$$

where $x_{known}$ denotes known pixels and $x_{unknown}$ denotes unknown pixels. Accordingly, $$\begin{bmatrix} A_{11} & A_{12} \\ A_{21} & A_{22} \end{bmatrix} \begin{bmatrix} x_{known} \\ x_{unknown} \end{bmatrix} = \begin{bmatrix} b_{known} \\ b_{unknown} \end{bmatrix}$$

Processor 148 may determine the unknown values by removing the contribution of known pixels from the system:

$$A_{22}x_{unknown} = b_{unknown} - A_{21}x_{known}$$

In an example, a 5MP RGB image may comprise from a few thousand to 30,000 unknowns.

Multi-Resolution Processing

To reduce the latency of the solver, multi-resolution processing may be employed. The system may initially be solved at a coarse resolution (e.g., using larger super-pixels). Subsequently, the solution from the coarse resolution solver may be used as an initial guess for finer resolutions. For example, an initial super-pixel size of 16×16 pixels may be used to generate a coarse solution. The solution from the course resolution may be refined at a 4×4 super-pixel size. An adaptive super-pixel size may be used to ensure that the number of unknowns remains below a predetermined level (e.g., 15,000).

Processor 148 may employ border matting and/or border smoothing to refine the borders of the final segmentation. For example, Gaussian filtering and/or interpolation may be used to smooth the edges of the segmented subject.

Figure 7:
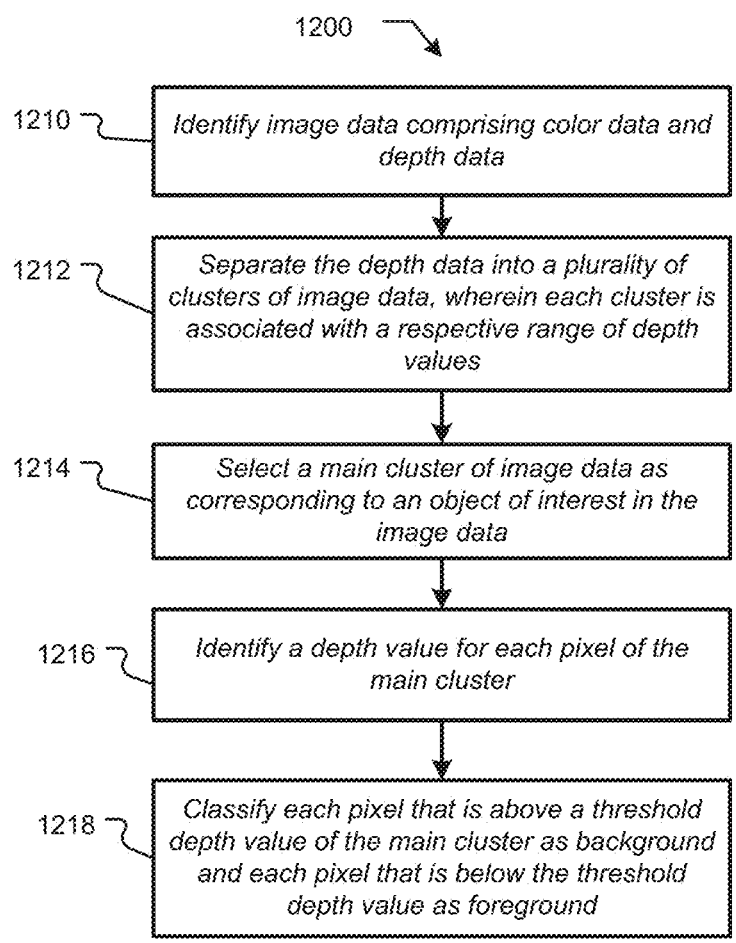
FIG. 7 depicts a flow chart showing an example process for segmentation of object image data from background image data, in accordance with various aspects of the present disclosure.

FIG. 7 is a flow chart showing an example histogram thresholding process for identifying pixels of image data corresponding to an object of interest, in accordance with various aspects of the present disclosure. The process flow 1200 of FIG. 7 may be executed by image capture device 116 and/or by a combination of image capture device 116 and a computing device configured to be in communication with image capture device 116, in accordance with various aspects of the present disclosure. The actions of process flow 1200 may represent a series of instructions comprising computer-readable machine code executable by a processing unit of a computing device or of image capture device 116. In various examples, the computer-readable machine code may be comprised of instructions selected from a native instruction set of the computing device and/or an operating system of the computing device. Various actions in process flow 1200 may be described with reference to elements of FIGS. 1-6.

Processing may begin at action 1210 of process flow 1200: "Identify image data comprising color data and depth data." In some examples, the image data may be captured by digital camera module 144 of image capture device 116 (depicted in FIG. 1B). Similarly, in some examples, the depth data may be captured by depth sensor 146 (depicted in FIG. 1B).

Processing may continue from action 1210 to action 1212, "Separate the depth data into a plurality of clusters of image data, wherein each cluster is associated with a respective range of depth values." At action 1212, the image data identified in step 1210 may be separated into a plurality of clusters or "blobs" based on similarities between depth values of pixels of the image data in the depth data.

Processing may continue from action 1212 to action 1214, "Select a main cluster of image data as corresponding to an object of interest in the image data." At action 1214, a main cluster of image data corresponding to the object of interest may be selected. As previously described, the main cluster or "blob" may be selected using a variety of techniques. Among the techniques that may be used to select the main cluster are: filtering out clusters that are either spatially too large or too small, filtering out clusters that are too far away from the image capture device (e.g., blobs with depth values that are above a predefined threshold value), selecting the closest cluster among appropriate candidate clusters after filtering out those clusters that are either too large (e.g., above an upper size threshold) or too small (e.g., below a lower size threshold), using training data, using computer vision techniques (e.g., facial recognition), etc. In various examples, filtering out clusters that are either too large or too small may include comparing the size of a cluster (e.g., the area) to a small threshold size and a large threshold size. The small threshold size may define a lower bound for an expected size range of objects of interest (e.g., clothing items). The large threshold size may define an upper bound for expected size ranges of objects of interest.

Processing may continue from action 1214 to action 1216, "Identify a depth value for each pixel of the main cluster." At action 1216, a depth value may be identified for each pixel of the selected main cluster. The depth value may be included in the depth data provided from the depth sensor (e.g., depth sensor 146 depicted in FIG. 1B). A histogram of the depth values may be plotted.

Processing may continue from action 1216 to action 1218, "Classify each pixel that is above a threshold depth value of the main cluster as background and each pixel that is below the threshold depth value as foreground." At action 1218, a depth threshold value may be identified. In various examples, the depth threshold value may be at or near a local minimum between two peaks appearing in a plot of the depth values of the selected main cluster. Pixels with depth values that are greater than the depth threshold value may be classified as background pixels, as these pixels may represent a human holding the object of interest in front of them or other background image data. Pixels with depth values that are less than the depth threshold value may be classified as foreground pixels, as these pixels may represent the object of interest. For example, these pixels may represent article of clothing 115 (depicted in FIG. 1A) held in front of a person using image capture device 116.

Figure 8:
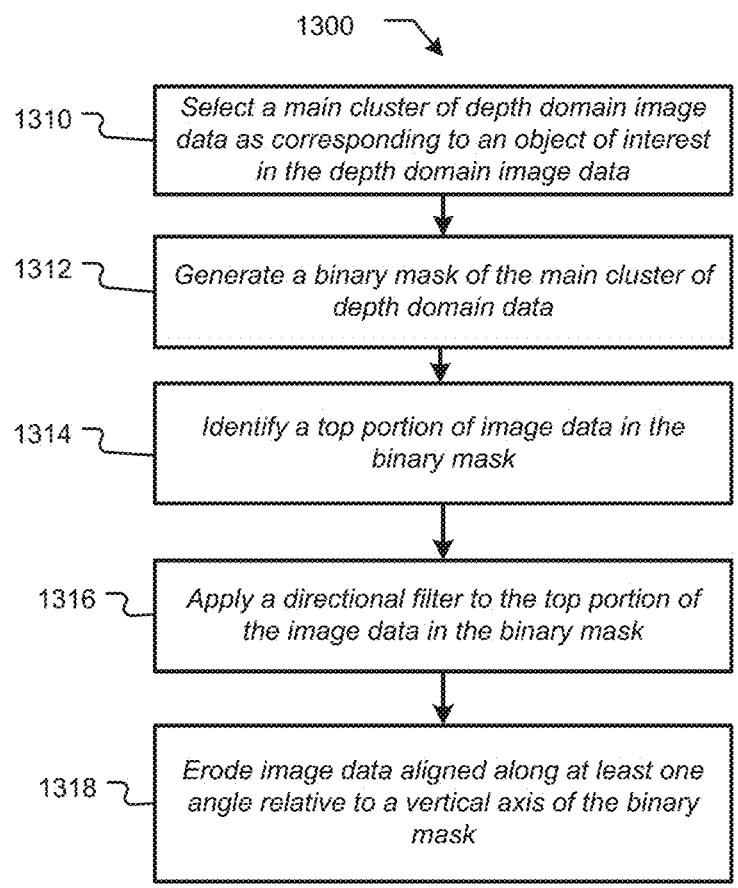
FIG. 8 depicts a flow chart showing an example process for filtering image data, in accordance with various aspects of the present disclosure.

FIG. 8 depicts a flow chart showing an example process for hanger segmentation of image data, in accordance with various aspects of the present disclosure. The process flow 1300 of FIG. 8 may be executed by image capture device 116 and/or by a combination of image capture device 116 and a computing device configured to be in communication with image capture device 116, in accordance with various aspects of the present disclosure. The actions of process flow 1300 may represent a series of instructions comprising computer-readable machine code executable by a processing unit of a computing device or of image capture device 116. In various examples, the computer-readable machine code may be comprised of instructions selected from a native instruction set of the computing device and/or an operating system of the computing device. Various actions in process flow 1300 may be described with reference to elements of FIGS. 1-7.

Processing may begin at action 1310 of process flow 1300, "Select a main cluster of depth domain image data as corresponding to an object of interest in the depth domain image data." At action 1310, a main cluster of image data corresponding to the object of interest may be selected. As previously described, the main cluster or "blob" may be selected using a variety of techniques. Among the techniques that may be used to select the main cluster are: filtering out clusters that are either spatially too large or too small, filtering out clusters that are too far away from the image capture device (e.g., blobs with depth values that are above a predefined threshold value), selecting the closest cluster among appropriate candidate clusters after filtering out those clusters that are either too large (e.g., above an upper size threshold) or too small (e.g., below a lower size threshold), using training data, using computer vision techniques (e.g., facial recognition), etc. In some examples, histogram thresholding (as described in reference to FIG. 7, for example) may be applied to the selected main cluster to further segment the object of interest from background image data.

Processing may continue from action 1310 to action 1312, "Generate a binary mask of the main cluster of depth domain data." At action 1312, a binary mask may be generated of the depth domain image data. Accordingly, in the binary mask pixels may take either a "1" value or a "0" value. Pixels that represent objects/surfaces that are closer to the image capture device 116 may take a "1" value, while background pixels that represent further objects/surfaces may take a "0" value in the binary mask.

Processing may continue from action 1312 to action 1314, "Identify a top portion of image data in the binary mask." At action 1314, image capture device 116 and/or a processor of image capture device 116 may identify a top portion of image data in the binary mask. For example, image capture device 116 may identify the top 20% of the pixels in the binary mask. In various examples, action 1314 may conserve computing resources by constraining the portion of the image to which to apply a directional filter.

Processing may continue from action 1314 to action 1316, "Apply a directional filter to the top portion of the main cluster of the image data in the binary mask." The directional filter may be designed so as to erode image data (e.g., set the image data to a local minimum value) that is oriented along a specified angle or pathway. The particular angle or pathway is defined by the particular design/implementation of the directional filter.

Processing may continue from action 1316 to action 1318, "Erode image data aligned along at least one angle relative to a vertical axis of the binary mask." At action 1318, image capture device 116 may be effective to erode image data aligned along an axis specified by the directional filter. As previously described, eroding the image data may comprise setting the value of the image data to "0" in the binary mask and accordingly labeling the pixels as background. In various examples, the angles may include common angles for clothing hanger geometry relative to a vertical axis of the image data. For example, −30°, −15°, 0°, 15°, and 30° may be used in a particular example. It should be appreciated that directional filters with other angles may be used depending on the geometry of the clothing hangers or other items to be filtered from the binary mask of the image data.

Figure 9:
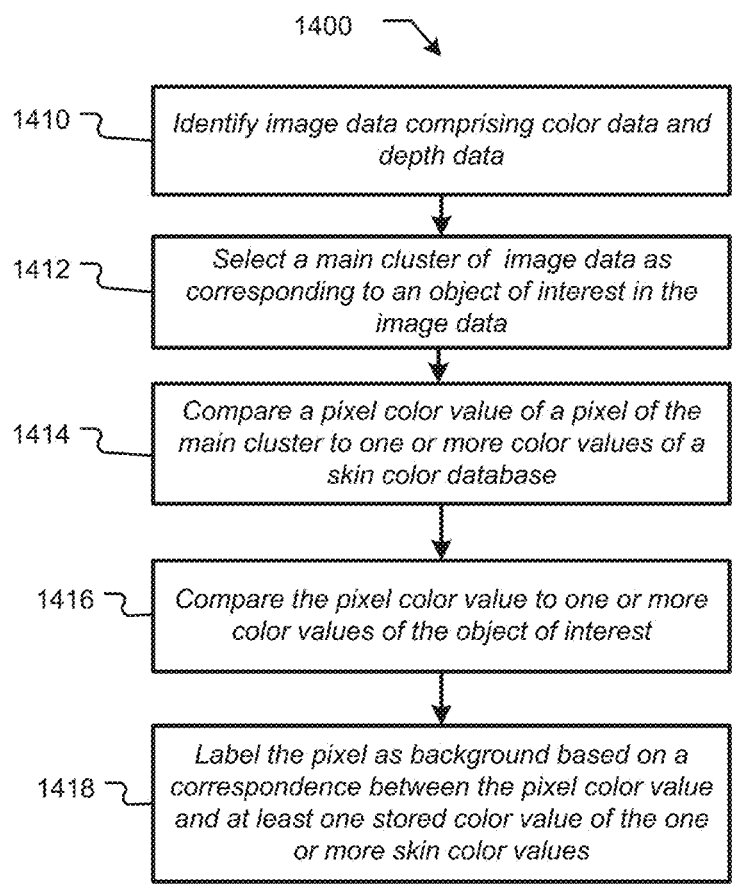
FIG. 9 depicts a flow chart showing an example process for filtering out pixels corresponding to colors of human skin, in accordance with image data segmentation techniques described herein.

FIG. 9 depicts a flow chart showing an example process for skin color filtering of image data, in accordance with various aspects of the present disclosure. The process flow 1400 of FIG. 9 may be executed by image capture device 116 and/or by a combination of image capture device 116 and a computing device configured to be in communication with image capture device 116, in accordance with various aspects of the present disclosure. The actions of process flow 1400 may represent a series of instructions comprising computer-readable machine code executable by a processing unit of a computing device or of image capture device 116. In various examples, the computer-readable machine code may be comprised of instructions selected from a native instruction set of the computing device and/or an operating system of the computing device. Various actions in process flow 1400 may be described with reference to elements of FIGS. 1-9.

Processing may begin at action 1410 of process flow 1400, "Identify image data comprising color data and depth data." In some examples, the image data may be captured by digital camera module 144 of image capture device 116 (depicted in FIG. 1B). Similarly, in some examples, the depth data may be captured by depth sensor 146 (depicted in FIG. 1B).

Processing may continue from action 1410 to action 1412, "Select a main cluster of image data as corresponding to an object of interest in the image data." At action 1414, a main cluster of image data corresponding to the object of interest may be selected. As previously described, the main cluster or "blob" may be selected using a variety of techniques. Among the techniques that may be used to select the main cluster are: filtering out clusters that are either spatially too large or too small, filtering out clusters that are too far away from the image capture device (e.g., blobs with depth values that are above a predefined threshold value), selecting the closest cluster among appropriate candidate clusters after filtering out those clusters that are either too large (e.g., above an upper size threshold) or too small (e.g., below a lower size threshold), using training data, using computer vision techniques (e.g., facial recognition), etc. In some examples, histogram thresholding (as described in reference to FIG. 7, for example) may be applied to the selected main cluster to further segment the object of interest from background image data.

Processing may continue from action 1412 to action 1414, "Compare a pixel color value of a pixel of the main cluster to one or more color values of a skin color database." At action 1414, pixel color values of the main cluster, or of a specified portion of the main cluster (e.g., the top 5%, 10%, 13%, 20%, 20.2%, etc.) may be compared to color values stored in a skin color database to determine a level of correspondence between the color values of the pixels and the color values stored in the skin color database.

Processing may continue from action 1414 to action 1416, "Compare the pixel color value to one or more color values of the object of interest." At action 1416, pixel color values may be compared to the color values of other pixels in the main cluster. The pixel color values may be compared to color values of other pixels in the main cluster to determine a level of correspondence between the color values of the pixels and the color values of other pixels in the object of interest.

Processing may continue from action 1416 to action 1418, "Label the pixel as background based on a correspondence between the pixel color value and at least one stored color value of the one or more skin color values." At action 1418, if a pixel is determined to correspond more closely to a color value of the skin color database relative to a correspondence between the color value of the pixel and the color values of other pixels in the object of interest, the pixel may be labeled as background to filter out human skin from the image data. Conversely, if the pixel is determined to correspond more closely to other pixels in the object of interest relative to a correspondence between the color value of the pixel and color values of the skin color database, the pixel may be labeled as foreground, as the pixel likely represents the object of interest.

Among other potential benefits, a system in accordance with the present disclosure may allow image data representing an object of interest to be segmented from other image data. For example, image data representing clothing suspended from a hanger and/or held by a human may be segmented from background image data (including image data representing the hanger and the human). Depth domain data may be used to identify a main blob of image data. The object of interest may be separated from other image data in the main blob using histogram thresholding of depth values. A binary mask may be generated from the depth domain data. Directional filters may be employed to remove a clothing hanger from the object of interest in the binary mask. A quad map may be generated using the depth domain image data. The quad map may label each pixel as "definite foreground", "definite background", "probable foreground", or "probable background". The quad map may be mapped on a pixel-by-pixel basis to a color image captured by a digital camera module. A skin filter may be applied to the color mapped image data. Pixels with color values that correspond more closely to skin color values in a skin color database may be labeled as background in order to segment human hands and other portions of the human body from the object of interest. Using depth domain data to perform image segmentation as described in the current disclosure may allow for low-latency, high quality segmentation of image data, even when processing and/or memory resources are limited.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. An image segmentation method comprising:
   receiving first image data comprising color data and depth values associated with pixels of the first image data;
   determining a first plurality of pixels of the first image data, the first plurality of pixels corresponding to a representation of an object of interest in the first image data;
   determining, based on a histogram of depth values of the first plurality of pixels, a threshold depth value;
   encoding a first set of pixels in the first plurality of pixels with foreground indicator data, wherein each of the first set of pixels has a first depth value less than the threshold depth value;
   encoding a second set of pixels from the first plurality of pixels with background indicator data, wherein each of the second set of pixels has a second depth value greater than the threshold depth value; and
   generating second image data representing the object of interest and including only the second set of pixels.

2. The method of claim 1, further comprising:
   separating the depth values of the first image data into a plurality of clusters, wherein each cluster of the plurality of clusters includes a portion of the depth values; and
   selecting a first cluster of the plurality of clusters, the first cluster corresponding to the first plurality of pixels of the first image data.

3. The method of claim 1, wherein the threshold depth value is a local minimum of the depth values in the histogram of depth values.

4. The method of claim 1, wherein the first set of pixels corresponds to an article of clothing, and wherein the second set of pixels corresponds to a user positioned behind and holding the article of clothing.

5. The method of claim 1, further comprising:
   identifying a ground plane in the first image data; and
   encoding pixels of the ground plane with the background indicator data.

6. The method of claim 1, further comprising:
   generating a two-dimensional binary mask of the first plurality of pixels of the first image data; and
   applying a directional filter to a portion of the first plurality of pixels of the first image data to filter first pixels aligned along an angle relative to an axis of pixels of the two-dimensional binary mask, wherein the angle is specified by the directional filter.

7. The method of claim 1, further comprising:
   associating each pixel of the color data with a corresponding third depth value;
   comparing a pixel color value of a pixel of the first plurality of pixels to color values of a color database, the color database including a plurality of color values, wherein each of the plurality of color values is associated with a different human skin tone;
   determining a similarity between the pixel color value and at least one color value of the color database; and
   encoding the pixel of the first plurality of pixels with the background indicator data.

8. The method of claim 1, further comprising:
   identifying a central window of pixels of the first image data, wherein the central window comprises a group of pixels;
   determining a number of pixels of the first plurality of pixels located within the central window; and
   comparing the number of pixels to a threshold number of pixels, wherein determining the first plurality of pixels comprises determining that the number of pixels exceeds the threshold number of pixels.

9. The method of claim 1, further comprising averaging pixel values along a border of the second image data with a Gaussian filter.

10. An image capture device comprising:
    a digital camera module effective to capture color data, wherein the color data is associated with pixels of first image data;
    a depth sensor effective to capture depth values associated with pixels of the first image data; and
    at least one processor in communication with the digital camera module and the depth sensor, the at least one processor effective to execute instructions that when executed by the at least one processor cause the image capture device to perform a method comprising:
      determining a first plurality of pixels of the first image data, the first plurality of pixels corresponding to a representation of an object of interest in the first image data;
      determining, based on a histogram of depth values of the first plurality of pixels, a threshold depth value;
      encoding a first set of pixels in the first plurality of pixels with foreground indicator data, wherein each of the first set of pixels has a first depth value less than the threshold depth value;

encoding a second set of pixels from the first plurality of pixels with background indicator data, wherein each of the second set of pixels has a second depth value greater than the threshold depth value; and generating second image data representing the object of interest and including only the second set of pixels.

11. The image capture device of claim 10, wherein the threshold depth value is a local minimum of the depth values in the histogram of depth values.

12. The image capture device of claim 10, wherein the first set of pixels corresponds to an article of clothing, and wherein the second set of pixels corresponds to a user positioned behind and holding the article of clothing.

13. The image capture device of claim 10, wherein the instructions when executed by the at least one processor are further effective to cause the image capture device to perform the method comprising:

identifying a ground plane in the first image data; and encoding pixels of the ground plane with background indicator data.

14. The image capture device of claim 10, wherein the instructions when executed by the at least one processor are further effective to cause the image capture device to perform the method comprising:

generating a two-dimensional binary mask of the first plurality of pixels of the first image data; and applying a directional filter to a portion of first plurality of pixels of the first image data to filter first pixels aligned along an angle relative to an axis of pixels of the two-dimensional binary mask, wherein the angle is specified by the directional filter.

15. The image capture device of claim 10, wherein the instructions when executed by the at least one processor are further effective to cause the image capture device to perform the method comprising:

associating each pixel of the color data with a corresponding third depth value;

comparing a pixel color value of a pixel of the first plurality of pixels to color values of a color database, the color database including a plurality of color values, wherein each of the plurality of color values is associated with a different human skin tone;

determining a similarity between the pixel color value and at least one color value of the color database; and encoding the pixel of the first cluster with the background indicator data.

16. The image capture device of claim 10, wherein the instructions when executed by the at least one processor are further effective to cause the image capture device to perform the method comprising:

identifying a central window of pixels of the first image data, wherein the central window comprises a group of pixels;

determining a number of pixels of the first plurality of pixels located within the central window; and comparing the number of pixels to a threshold number of pixels, wherein determining the first plurality of pixels comprises determining that the number of pixels exceeds the threshold number of pixels.

17. The image capture device of claim 10, wherein the instructions when executed by the at least one processor are further effective to cause the image capture device to perform the method comprising averaging pixel values along a border of the first plurality of pixels with a Gaussian filter.

18. An image capture device comprising:

a depth sensor effective to capture depth values associated with pixels of first image data; and at least one processor in communication with the depth sensor, the at least one processor effective to execute instructions that when executed by the at least one processor cause the image capture device to perform a method comprising:

determining a first plurality of pixels of the first image data, the first plurality of pixels corresponding to a representation of an object of interest in the first image data;

determining, based on a histogram of depth values of the first plurality of pixels, a threshold depth value;

encoding a first set of pixels in the first plurality of pixels with foreground indicator data, wherein each of the first set of pixels has a first depth value less than the threshold depth value;

encoding a second set of pixels from the first plurality of pixels with background indicator data, wherein each of the second set of pixels has a second depth value greater than the threshold depth value; and generating second image data representing the object of interest and including only the second set of pixels.

19. The image capture device of claim 18, wherein the instructions when executed by the at least one processor are further effective to cause the image capture device to perform the method comprising:

determining a third set of pixels of color image data corresponding to the second set of pixels in the second image data; and generating third image data representing the object of interest in the color image data and including only the third set of pixels.

20. The image capture device of claim 18, wherein the instructions when executed by the at least one processor are further effective to cause the image capture device to perform the method comprising:

generating a two-dimensional binary mask of the first plurality of pixels of the first image data; and applying a directional filter to a portion of first plurality of pixels of the first image data to filter first pixels aligned along an angle relative to an axis of pixels of the two-dimensional binary mask, wherein the angle is specified by the directional filter.

* * * * *